United States Patent
Tsutsui et al.

[19]

[11] Patent Number: 6,139,471
[45] Date of Patent: Oct. 31, 2000

[54] CONTROL SYSTEM FOR AUTOMATIC TRANSMISSION

[75] Inventors: Hiroshi Tsutsui, Nishio; Kazumasa Tsukamoto, Toyota; Masahiro Hayabuchi, Anjo; Yoshihisa Yamamoto, Nishio; Akihito Iwata, Hekinan, all of Japan

[73] Assignee: Aisin AW Co., Ltd., Japan

[21] Appl. No.: 08/706,410

[22] Filed: Aug. 30, 1996

[30] Foreign Application Priority Data

Aug. 31, 1995 [JP] Japan .................................. 7-224312

[51] Int. Cl.[7] .................................................. F16H 61/20
[52] U.S. Cl. .......................... 477/156; 477/155; 477/174
[58] Field of Search ................................... 477/115, 120, 477/155, 156, 174, 175

[56] References Cited

U.S. PATENT DOCUMENTS

| | | |
|---|---|---|
| 4,283,970 | 8/1981 | Vukovich . |
| 4,742,461 | 5/1988 | Eschrich . |
| 4,755,938 | 7/1988 | Hiramatsu . |
| 4,898,049 | 2/1990 | Niijkura . |
| 4,969,545 | 11/1990 | Hayashi .................................. 477/176 |
| 5,050,714 | 9/1991 | Kurihara et al. ......................... 477/176 |
| 5,179,875 | 1/1993 | Brown . |
| 5,272,630 | 12/1993 | Brown et al. . |
| 5,307,727 | 5/1994 | Berger et al. . |
| 5,435,796 | 7/1995 | Fujita et al. ......................... 477/155 X |
| 5,443,432 | 8/1995 | Fujita et al. ............................. 477/155 |
| 5,445,577 | 8/1995 | Fujita et al. ............................. 477/120 |
| 5,445,579 | 8/1995 | Fujita et al. ............................. 477/156 |
| 5,454,763 | 10/1995 | Ikebuchi et al. .................... 477/120 X |

FOREIGN PATENT DOCUMENTS

| | | |
|---|---|---|
| 0436978 A2 | 7/1991 | European Pat. Off. . |
| 61-136055 | 6/1986 | Japan . |

*Primary Examiner*—Charles A. Marmor
*Assistant Examiner*—Peter T. Kwon
*Attorney, Agent, or Firm*—Lorusso & Loud

[57] ABSTRACT

A control system for an automatic transmission includes a fluid transmission unit connected to an engine; a clutch; a hydraulic servo; output RPM detector for detecting the output RPM of the fluid transmission unit; oil pressure generator for generating the oil pressure fed to the hydraulic servo; and a control unit. The control unit includes a booster for raising the oil pressure according to preset characteristics; change rate detector for detecting the RPM change rate of the output RPM in a preset range at the application of the clutch; and a corrector for correcting the preset characteristics by comparing the detected RPM change rate and a reference RPM change rate. The change rate detector detects the RPM change rate only when the output RPM at the time of starting the engagement of the clutch is higher by a preset value than the maximum of the output RPM in the preset range.

10 Claims, 21 Drawing Sheets

FIG. 3

|  |  | Solenoid | | | Clutch | | | Brake | | | | One-Way Clutch | | |
|---|---|---|---|---|---|---|---|---|---|---|---|---|---|---|
|  |  | S1 | S2 | S3 | C1 | C2 | C3 | B1 | B2 | B3 | B4 | F1 | F2 | F3 |
| R |  | × | ○ | × | × | ○ | × | × | × | ○ | ○ | × | × | × |
| N |  | × | ○ | × | × | × | × | × | × | × | ○ | × | × | × |
| D | 1ST | × | ○ | △ | ○ | × | × | × | × | (○) | ○ | × | ○ | ○ |
| D | 2ND | ○ | ○ | △ | ○ | × | × | ○ | ○ | × | ○ | ○ | × | ○ |
| D | 3RD | ○ | × | × | ○ | × | ○ | ○ | ○ | × | × | ○ | × | × |
| D | 4TH | × | × | × | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to a control system for an automatic transmission.

2. Related Art

In the automatic transmission of the prior art, the rotation output from the engine is transmitted through a fluid transmission unit, such as a torque converter, to a speed change unit. Between the fluid transmission unit and the speed change unit is arranged a first clutch (or input clutch) which can be applied/released for shifting between a neutral range (hereinafter "N-range") and a forward running range (hereinafter "D-range").

In the prior art automatic transmission, when the D-range is selected with the vehicle speed at zero, with the accelerator pedal released and the brake pedal depressed, neutral control is effected by lowering the oil pressure of the hydraulic servo to release the first clutch so that the load on the engine is reduced to improve the fuel economy and to prevent the vehicle from vibrating.

In the automatic transmission thus constructed, when the first clutch is to be applied, the output RPM of the torque converter is detected so that application shock due to engagement of the first clutch may be prevented by feeding, to the hydraulic servo of the first clutch, an oil pressure corresponding to the output RPM, as disclosed in Japanese Patent Laid-Open No. 136055/1986.

In the automatic transmission of the prior art described above, however, the output RPM of the torque converter is detected, and the oil pressure is generated, according to the detected output RPM so that proper engaging characteristics cannot be attained.

Generally speaking, when the RPM of a rotary member is to be detected, a plurality of projections, formed on the rotary member, are detected by an RPM detecting sensor so that the RPM is calculated in terms of the time period from the detection of one projection to the detection of a subsequent projection.

If the output RPM of the torque converter is to be detected by the RPM detecting sensor when the vehicle is standing still as in neutral control, the time period between detection of one projection and detection of the next one is prolonged because of the relatively small output RPM, so that the time period required for calculating the output RPM is likewise prolonged and detection is thereby delayed.

Thus, when the vehicle stops, poor responsiveness makes real time feedback control impossible which, in turn, makes it impossible to achieve the proper engaging characteristics.

It is theoretically possible to correct and learn the oil pressure for applying the first clutch the next time, if the RPM change rate of the output RPM, as detected, is different from a target RPM change rate. However, this learning control encounters several problems.

Specifically, at the initial stage of engagement of the first clutch, the output RPM is not only unstable because of the delay in the rise of the oil pressure fed to the hydraulic servo but also fluctuates due to the influence of factors other than the oil pressure.

While the output RPM is relatively low, moreover, it cannot be detected because the RPM detecting sensor has a detection limit.

Thus, not only does the output RPM fluctuate due to various factors but, also, the output RPM cannot be detected, so that an accurate RPM change rate cannot be determined, thus inviting erroneous learning.

SUMMARY OF THE INVENTION

Accordingly, an objective of the present invention is solution of the aforementioned problems of the automatic transmissions of the prior art and provision of a control system for an automatic transmission which can achieve an accurate RPM change rate and proper engaging characteristics without any erroneous learning.

The present invention, therefore, provides a control system for an automatic transmission including a fluid transmission unit connected to an engine, a clutch applied when a forward running range is selected, for transmitting the rotation of the fluid transmission unit to a speed change unit, and a hydraulic servo for applying the clutch responsive to feed of an oil pressure under control of a control unit. Output RPM detecting means detects the output RPM of the fluid transmission unit and oil pressure generating means generates the oil pressure fed to the hydraulic servo.

The control unit includes: booster means for raising the oil pressure according to preset characteristics; change rate detecting means for detecting the RPM change rate of the output RPM within a preset (predetermined) range for application of the clutch; and correction means for correcting the preset characteristics on the basis of a comparison of the RPM change rate, as detected by the change rate detecting means, with a reference RPM change rate.

The change rate detecting means detects the RPM change rate only when the output RPM at the time of starting the engagement of the clutch is higher by a preset value than the maximum of the output RPM in the preset range. In this case, when the vehicle is to be started by selecting a forward running range with transition out of the neutral range, and when the vehicle is started by selection of the forward running range while in neutral control, the set characteristics of the oil pressure generating means are corrected on the basis of the RPM change rate of the output RPM of the fluid transmission unit.

Moreover, when the output RPM at the time of starting the engagement of the clutch is larger by a preset value than the maximum of the output RPM in the preset range, the RPM change rate of the output RPM is detected. As a result, the RPM change rate at the initial stage of engagement is excluded from the detected RPM change rate so that the RPM change rate corresponding to the oil pressure to be generated can be accurately detected. This makes it possible to prevent erroneous learning.

In one embodiment of the present invention, the booster means lowers the oil pressure fed to the hydraulic servo to thereby substantially release the clutch when the vehicle is stopped while the forward running range is selected, and raises the oil pressure fed to the hydraulic servo, according to the preset characteristics, when the vehicle is to be started in motion. In this case, when the vehicle is to be started by selection of the forward running range while in neutral control, the preset characteristics for the oil pressure generating means are corrected on the basis of the RPM change rate of the output RPM of the fluid transmission unit.

In another embodiment of the present invention, the preset value is set on the basis of the delay in the rise of the oil pressure fed to the hydraulic servo so that the number of chances of correcting the preset characteristics for the oil pressure generating means can be maximized.

In yet another embodiment of the present invention, the correction means corrects the preset characteristics on the basis of the result of a comparison between the average of a plurality of RPM change rates detected by the change rate detecting means and the reference RPM change rate. In this case, the preset characteristics are corrected on the basis of the average value of the RPM change rates so that a unique RPM change rate can be excluded when detected. This makes it possible to detect an accurate RPM change rate.

In still another embodiment of the present invention, the correction means corrects the preset characteristics so that the RPM change rate, as detected by the change rate detecting means, may gradually approach the reference RPM change rate. In this case, the detected RPM change rate does not abruptly approach the reference RPM change rate, so that the influences to be exerted upon the correction of the preset characteristics of the booster means can be reduced even if the detected RPM change rate is not accurate.

In yet other embodiments, the change rate detecting means detects the RPM change rate only when an oil temperature is within a preset range. In this case, the RPM change rate for excessively high/low oil temperatures is excluded so that no influence is exerted upon the RPM change rate as detected even if the feed state of the oil pressure and the slip state in the clutch fluctuate due to change in the viscous resistance of the oil.

In another embodiment, the change rate detecting means detects the RPM change rate only when the engagement of the clutch is started from the substantially released state. In this case, the RPM change rate when the clutch is not substantially released is excluded so that no influence is exerted upon the correction of the preset characteristics for the booster means even if there is a change in oil pressure feed characteristics.

In another embodiment of the present invention, the change rate detecting means detects the RPM change rate only when the RPM of the engine is within a preset range. In this case, the RPM change rate when the engine RPM is excessively high/low, i.e. outside the ordinary idling range, is excluded so that no influence is exerted upon the RPM change rate if the engine RPM becomes unstable.

In a further embodiment of the present invention, the minimum of the output RPM of the preset range is set on the basis of the detection limit of the output RPM detecting means. In this case, the RPM change rate, when the output RPM is so small that it cannot be detected by the output RPM detecting means, is excluded so as not to influence the RPM change rate as detected.

BRIEF DESCRIPTION OF THE DRAWINGS

FIG. 3 is a table enumerating the operations of the automatic transmission in an embodiment of the present invention;

DESCRIPTION OF THE PREFERRED EMBODIMENT

Preferred embodiments of the present invention will now be described with reference to the accompanying drawings.

Figure 1:
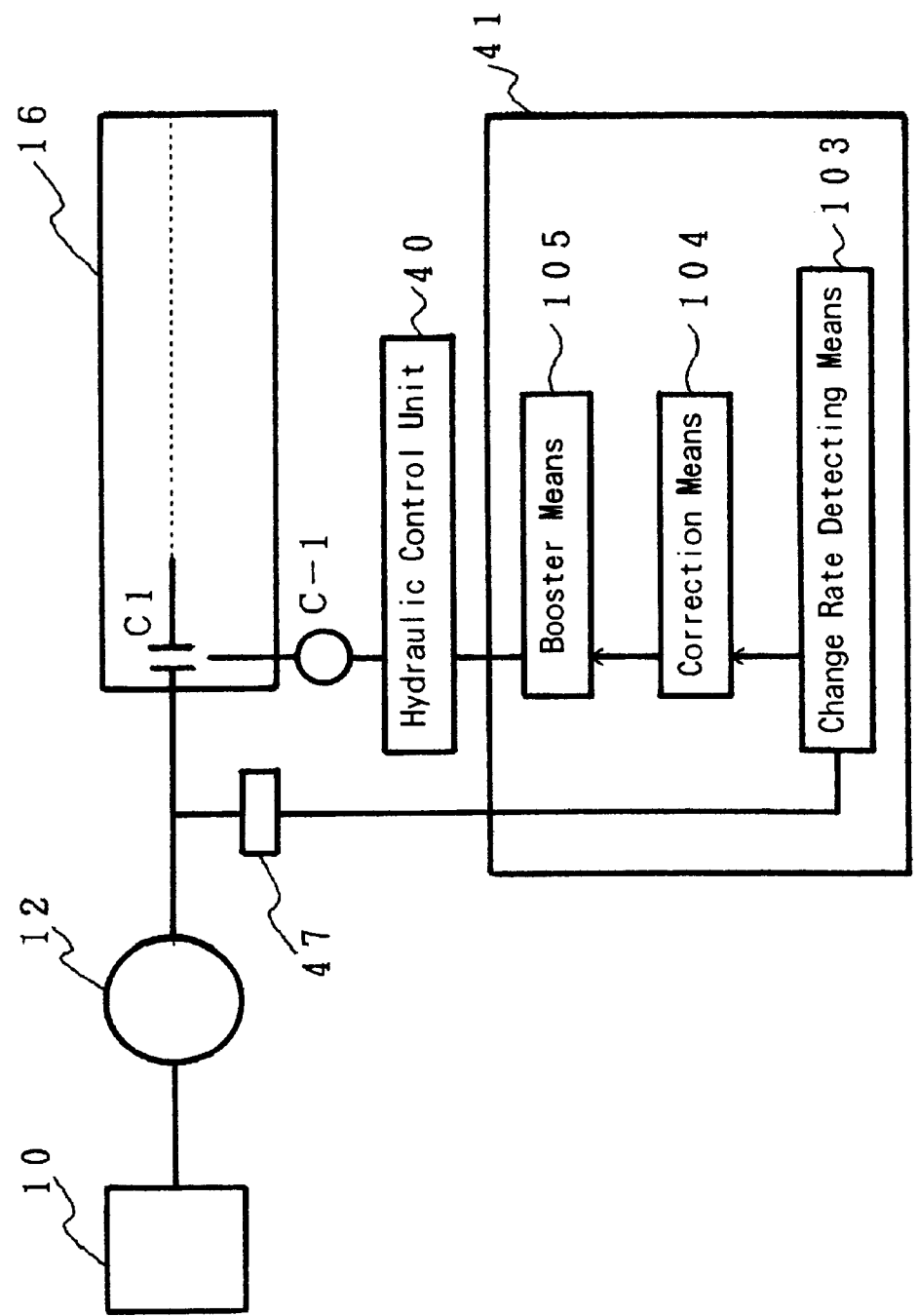
FIG. 1 is a block diagram of an embodiment of a control system of an automatic transmission in accordance with the present invention.

In FIG. 1: reference numeral 10 designates an engine; numeral 12 a torque converter acting as a fluid transmission unit for transmitting the rotation of the engine 10 to a speed change unit 16; C1 a first clutch which is applied when a forward running range is selected, for transmitting the rotation from the torque converter 12 to the transmission mechanism of the speed change unit 16; C-1 a hydraulic servo for applying/releasing the first clutch C1; and 40 a hydraulic control unit acting as oil pressure generating means for generating an oil pressure to be fed to the hydraulic servo C-1. Moreover, reference numeral 41 designates an automatic transmission control unit acting as a control system; numeral 47 a RPM sensor acting as output RPM detecting means for detecting the output RPM of the torque converter 12; numeral 103 change rate detecting means for detecting the RPM change rate of the output RPM; numeral 104 correction means for correcting the preset characteristics; and numeral 105 booster means for raising the oil pressure according to the preset characteristics.

Figure 2:
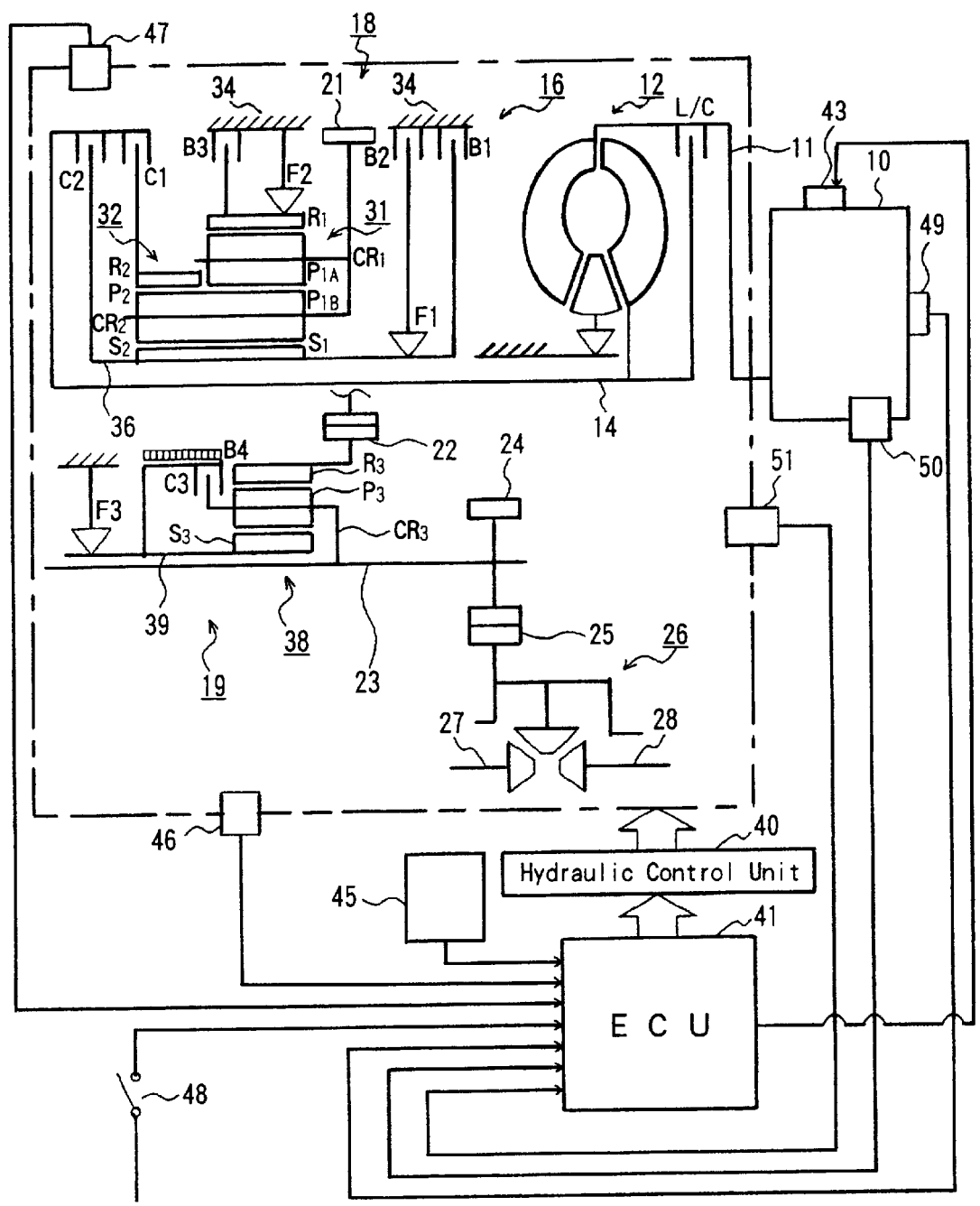
FIG. 2 is a schematic diagram of an automatic transmission to which the control system of FIG. 1 is applied.

As shown in FIG. 2 rotation generated by the engine 10 is transmitted through an output shaft 11 to the torque converter 12. Torque converter 12, in turn, transmits the rotation of the engine 10 to an output shaft 14 either through a fluid (or working oil) or directly to the output shaft 14 when the vehicle speed exceeds a predetermined value by applying a lockup clutch L/C.

The output shaft 14 is connected the speed change unit 16 which has the capability of establishing four forward and one reverse speeds. This speed change unit 16 includes a main transmission 18 for establishing three forward and one reverse speeds and an under-drive auxiliary transmission 19. The rotation of the main transmission 18 is transmitted through a counter drive gear 21 and a counter driven gear 22 to the auxiliary transmission 19, and the rotation of the output shaft 23 of the auxiliary transmission 19 is transmitted through an output gear 24 and a ring gear 25 to a differential mechanism 26.

In the differential mechanism 26, the rotation, as received through the output gear 24 and the ring gear 25, is differentiated so that the differential rotations are transmitted through lefthand and righthand drive shafts 27 and 28 to the drive wheels (not shown).

The main transmission 18 includes a first planetary gear unit 31 and a second planetary gear unit 32. Further included are the first clutch C1, a second clutch C2, a first brake B1, a second brake B2, a third brake B3 and one-way clutches F1 and F2 for transmitting the torque selectively between the individual elements of the first planetary gear unit 31 and the second planetary gear unit 32.

The first planetary gear unit 31 is composed of: a ring gear $R_1$ connected to a drive unit casing 34 through the third brake B3 and the one-way clutch F2 which are arranged in parallel with each other; a sun gear $S_1$ formed on a sun gear shaft 36 fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, as arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The counter drive gear 21 is meshed with the counter driven gear 22 in the auxiliary transmission 19, to transmit the rotation, at a speed established by the main transmission 18, to the auxiliary transmission 19.

This auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshing between the ring gear $R_3$ and the sun gear $S_3$ and rotatably supported by the carrier $CR_3$.

Operations of the above-described automatic transmission are summarized in the table of FIG. 3 in which S1 designates a first solenoid valve, S2 designates a second solenoid valve, S3 designates a third solenoid valve, C1 designates the first brake, C2 designates the second clutch, C3 designates the third clutch, B1 designates the first brake, B2 designates the second brake, B3 designates the third brake, B4 designates the fourth brake and F1 to F3 designate the one-way clutches. R designates a reverse running range, N designates N-range, D designates a D-range, 1ST designates a 1st-speed gear stage, 2ND designates a 2nd-speed gear stage, 3RD designates a 3rd-speed gear stage and 4TH designates a 4th-speed gear stage.

Moreover, symbol ◯ indicates "ON" for a first solenoid signal $S_1$, a second solenoid signal $S_2$ and a third solenoid signal $S_3$ for opening/closing the first solenoid valve S1, the second solenoid valve S2 and the third solenoid valve S3, respectively. Symbol ◯ also indicates application of the first clutch C1, the second clutch C2, the third clutch C3, the first brake BE, the second brake B2, the third brake B3 and the fourth brake B4 and locking of the one-way clutches F1 to F3. On the other hand, symbol X indicates that the first solenoid signal S1, the second solenoid signal $S_2$ and the third solenoid signal $S_3$ for opening/closing the first solenoid valve S1, the second solenoid valve S2 and the third solenoid valve S3 are OFF, that the first clutch C1, the second clutch C2, the third clutch C3, the first brake B1, the second brake B2, the third brake B3 and the fourth brake B4 are released, and that the one-way clutches F1 to F3 are free.

Symbol Δ indicates a component which is turned ON/OFF in neutral control, and symbol (◯) indicates that the third brake B3 is applied in engine braking.

At the 1st speed in the D-range, the first clutch C1 and the fourth brake B4 are applied to lock the one-way clutches F2 and F3. The rotation of the output shaft 14 is then transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while idly rotating the sun gear $S_2$.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. The rotation of the output shaft 14 is then transmitted through the first clutch C1 to the ring gear $R_2$. The rotation of this ring gear $R_2$ is decelerated and transmitted to the carrier $CR_2$, because the rotation of the sun gear $S_2$ is blocked by the second brake D2 and the one-way clutch F1. The rotation of the carrier $CR_2$ is transmitted to the counter drive gear 21 while idly rotating the ring gear $R_1$.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while idly rotating the ring gear $R_1$.

The rotation, as transmitted from the counter drive gear 21 to the counter driven gear 22, is transmitted to the ring gear $R_3$. However, relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted without speed change to the output shaft 23.

Next, at the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into direct-coupled states. As a result, the rotation of the output shaft 11 is transmitted without speed change to the counter drive gear 21.

The rotation, as transmitted from the counter drive gear 21 to the counter driven gear 22, is transmitted to the ring gear $R_3$. However, relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted without change in speed to the output shaft 23.

Hydraulic control unit 40 controls shifting between the individual gear stages by applying/releasing the first clutch C1, the second clutch C2, the third clutch C3, the first brake E1, the second brake B2, the third brake B3 and the fourth brake B4.

The engine 10 is provided with an engine control unit 43.

Both the hydraulic control unit 40 and the engine control unit 43 are connected to the automatic transmission control system (ECU) 41 so that they are operated according to the control program of the automatic transmission control system 41. This automatic transmission control system 41 receives signals from a neutral start switch 45, an oil temperature sensor 46, a RPM sensor 47, a brake switch 48, the engine RPM sensor 49, a throttle opening sensor 50 and a vehicle speed sensor 51.

The shift position of the shift lever (not shown), i.e., the selected range, is detected by the neutral start switch 45. The temperature of the oil in the hydraulic control unit 40 is detected by the oil temperature sensor 46. The output RPM of the torque converter 12 (hereinafter "clutch input side RPM") $N_{C1}$, located at the input side of the first clutch C1, is detected by the RPM sensor 47.

Depression or release of the foot brake pedal is detected by the brake switch 48. Engine RPM $N_E$ is detected by the engine RPM sensor 49. Throttle opening θ is detected by the throttle opening sensor 50. The vehicle speed is detected by the vehicle speed sensor 51.

Figure 4:
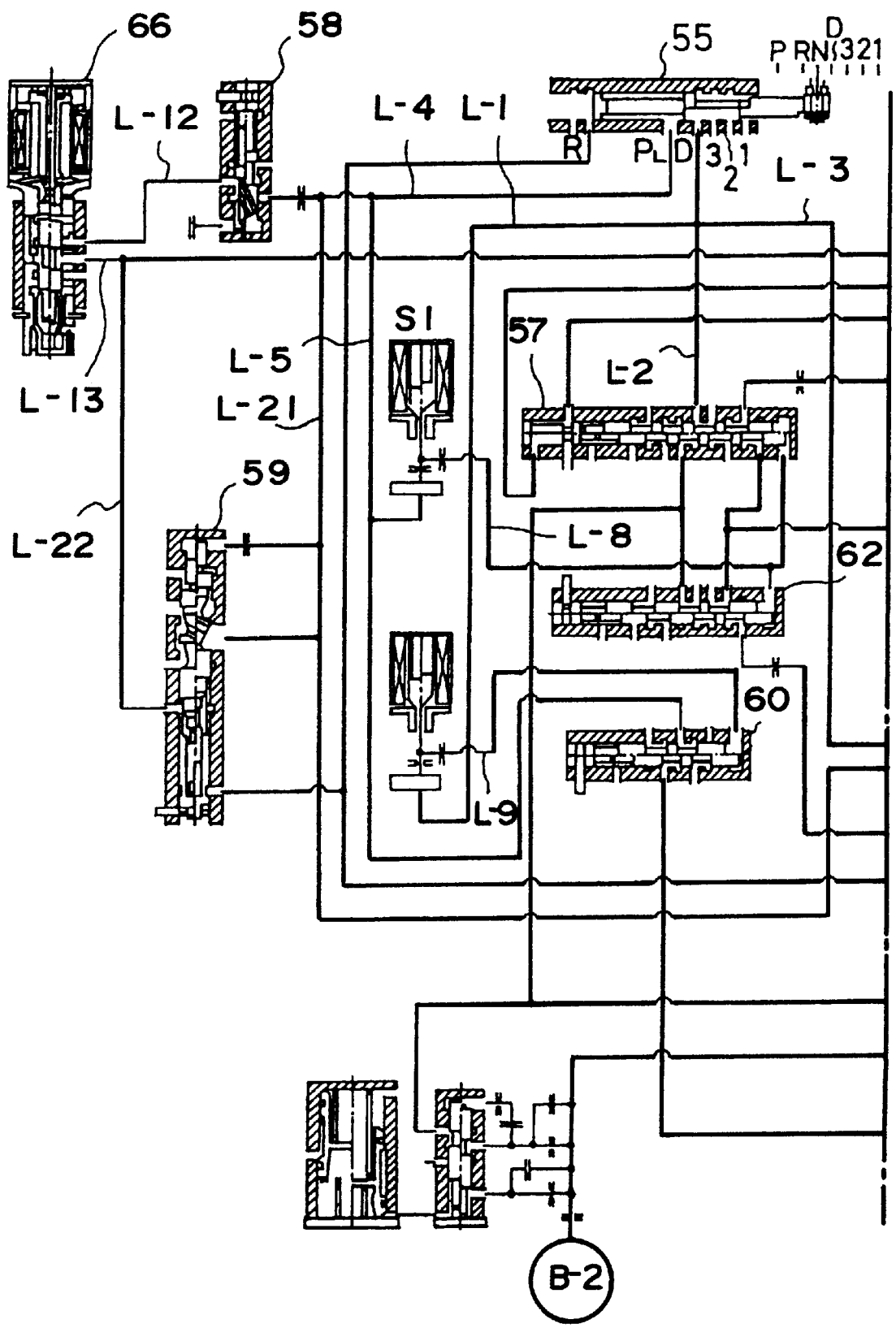
FIG. 4 is part of a hydraulic circuit diagram in one embodiment of the present invention.
Figure 5:
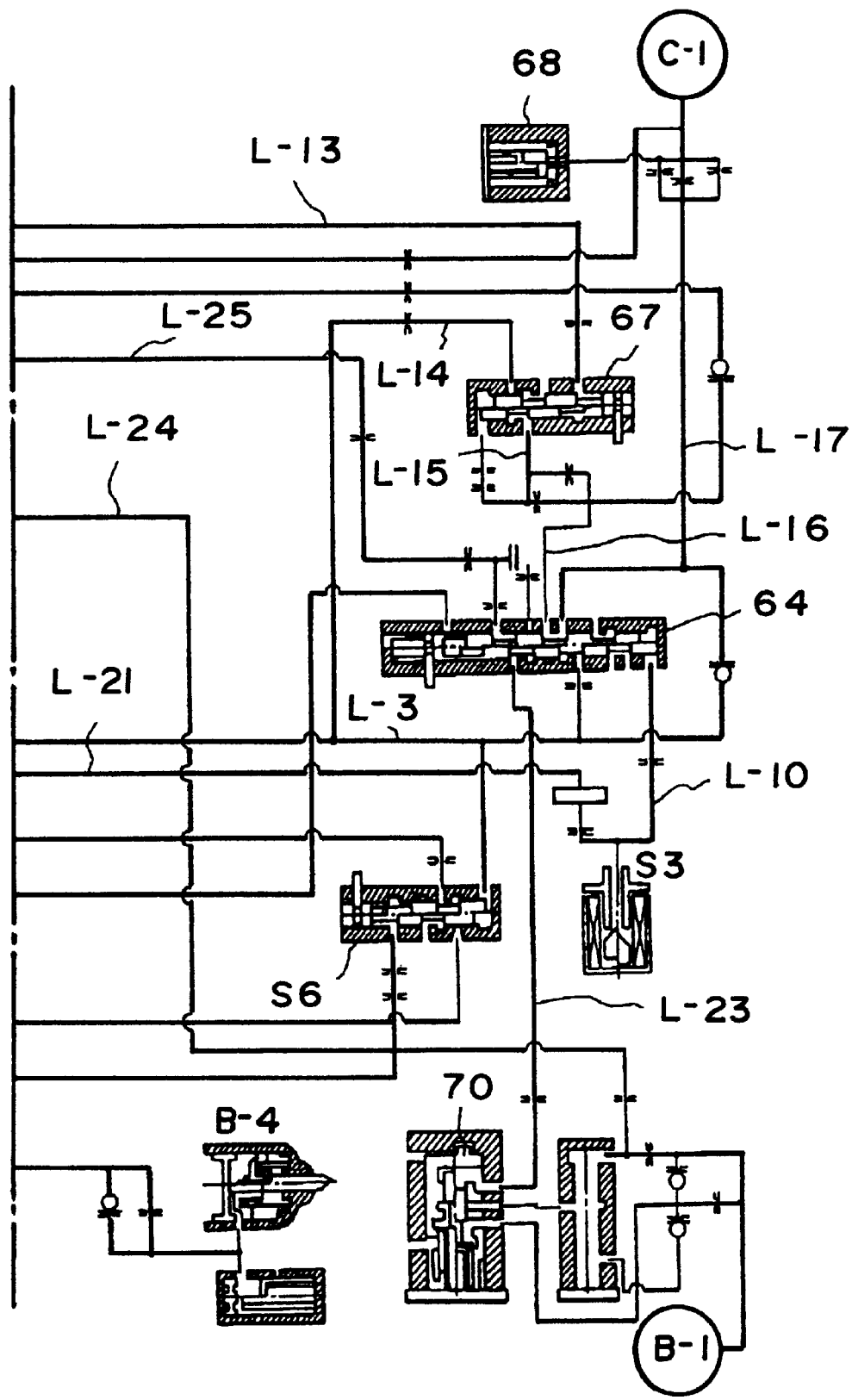
FIG. 5 is the remainder of the hydraulic circuit diagram of FIG. 4.

As shown in FIGS. 4 and 5, a primary valve 59 regulates the oil pressure coming from the oil pressure source and outputs it as a line pressure to an oil line L-21. A manual valve 55 is provided with ports 1, 2, 3, D, PL and R so that the line pressure, as fed from the primary valve 59 through oil lines L-21 and L-4 to the port PL, is established as 1-range, 2-range, 3-range, D-range and R-range pressures at the respective ports 1, 2, 3, D and R by manipulation of the shift lever.

When the shift lever is placed in the D-range position, the D-range pressure oil, as established at the port D, is fed through an oil line L-1 to the second solenoid valve S2, through an oil line L-2 to a 1-2 shift valve 57, and through an oil line L-3 to a B-1 sequence valve 56. On the other hand, the line pressure from the primary valve 59 is fed through the oil line L-21 to the third solenoid valve S3.

Moreover, the line pressure from the oil line L-21 is fed through the oil line L-4 to a solenoid modulator valve 58 and through an oil line L-S to the first solenoid valve S1 and a 2-3 shift valve 60.

The first solenoid signal $S_1$, the second solenoid signal $S_2$ and the third solenoid signal $S_3$ for opening/closing the first solenoid valve S1, the second solenoid valve S2 and the third solenoid valve S3 are turned ON/OFF in response to a change-over signal coming from the automatic transmission control system 41 (FIG. 2). As a result, the first solenoid valve S1 feeds a signal oil pressure through an oil line L-8 to the 1-2 shift valve 57 and a 3-4 shift valve 62. The second solenoid valve S2 feeds a signal oil pressure through an oil line L-9 to the 2-3 shift valve 60. The third solenoid valve S3 feeds a change-over signal oil pressure through an oil line L-10 to a neutral relay valve 64.

The 1-2 shift valve 57 takes the position shown as the upper half position in the drawing in 1st speed and the lower half position in 2nd to 4th speeds. The 2-3 shift valve 60 takes the lower half position in the 1st and 2nd speeds and the upper half position in the 3rd and 4th speeds. The 3-4 shift valve 62 takes the upper half position in the 1st and 4th speeds and the lower half position in the 2nd and 3rd speeds. The neutral relay valve 64 takes the upper half position in neutral control and the lower half position in the 1st to 4th speeds.

The solenoid modulator valve 58 is connected through an oil line L-12 to a linear solenoid valve 66, which is connected through an oil line L-13 to a C-1 control valve 67. The linear solenoid valve 66 is further connected through an oil line L-22 to the primary valve 59.

Linear solenoid valve 66 is controlled by a control signal received from the automatic transmission control system 41, feeds a throttle pressure $P_{TH}$ as the control signal oil pressure through the oil line L-13 to the C-1 control valve 67. The C-1 control valve 67, in turn, receives the D-range pressure through the oil lines L-3 and L-14 and regulates the received D-range pressure to output a control oil pressure (hereinafter "C-1 oil pressure") $P_{C1}$, responsive to the throttle pressure $P_{TH}$ coming from the linear solenoid valve 66, and feeds the C-1 oil pressure $P_{C1}$ to an oil line L-15.

A spring is arranged in the B-1 sequence valve 56, at the lefthand end in the drawing, whereas a control oil chamber is formed at the righthand end of the valve 56 for applying opposing loads to the spool. The B-1 sequence valve 56 in 1st speed takes the lower half position in response to the D-range pressure it receives in its control oil chamber through the oil line L-3. As the oil pressure fed in 2nd speed to hydraulic servo B-2 is raised, the B-1 sequence valve 56 receives the sequence pressure from the hydraulic servo B-2 and is thereby caused to move to the upper half position, i.e. its spool is moved rightward by the sequence pressure and the spring load.

As a result, the oil pressure from the 1-2 shift valve 57 is fed through the B-1 sequence valve 56 to the 3-4 shift valve 62 and further from the 3-4 shift valve 62 through an oil line L-24 and the b-1 control valve 70 to a hydraulic servo B-1. Thus, the oil pressure is fed to the hydraulic servo B-1 in response to the rise of the oil pressure in the hydraulic servo B-2.

The neutral relay valve 64 takes the upper half position during neutral control. In neutral control, therefore, the C-1 oil pressure $P_{C1}$, as established in the oil line L-15, is fed through an oil line L-16, the neutral relay valve 64 and an oil line L-17 to the hydraulic servo C-1. On the other hand, the oil pressure, as fed through the B-1 sequence valve 56 to the 3-4 shift valve 62, is also fed to the 1-2 shift valve 57 and further as the signal pressure from the 1-2 shift valve 57 through an oil line L-25, the neutral relay valve 64 and an oil line L-23 to the B-1 control valve 70.

In the 1st to 4th speeds the neutral relay valve 64 takes the lower half position. In the 1st to 4th speeds, therefore, the oil at D-range pressure is fed through the oil line L-3, the neutral relay valve 64 and the oil line L-17 to the hydraulic servo C-1. For neutral control, the neutral relay valve 64 is switched to the upper half position to connect the oil line L-16 and the oil line L-17.

A damper valve 68 is arranged in the oil line L-17 for smoothing the release of the oil from the hydraulic servo C-1.

Incidentally, B-4 designates the hydraulic servo which operates the fourth brake B4 (FIG. 3).

Figure 6:
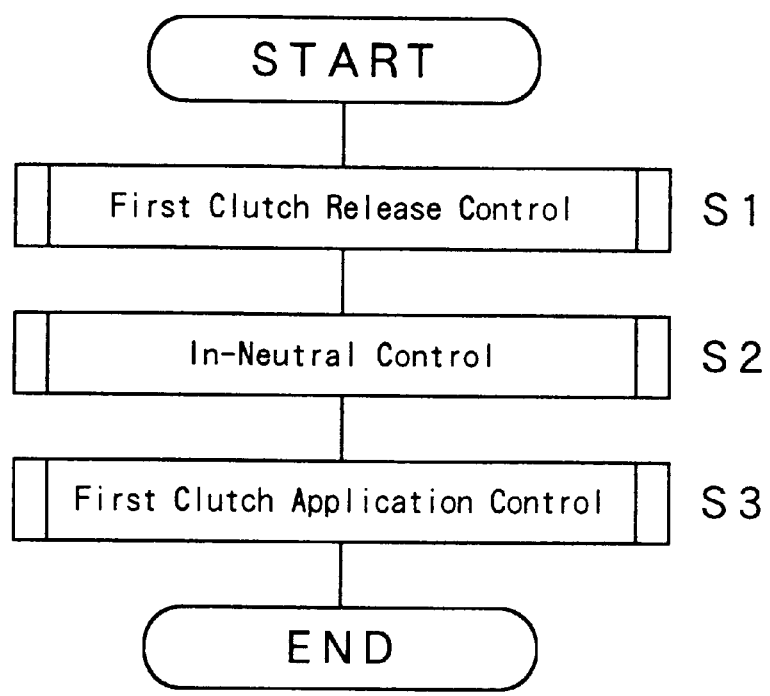
FIG. 6 is a flow chart of a neutral control routine used by the control system of the present invention.

With reference now to the neutral control subroutine of FIG. 6, in step S1 the automatic transmission control system 41 (FIG. 1) executes the first clutch release control. In this step, zero vehicle speed is estimated to output the 2nd speed shift signal at a set timing so that application of the second brake B2 (FIG. 2) and of the first brake B1 are started to provide hill-hold control with sweep down of the C-1 oil pressure $P_{C1}$ at a set timing.

For this purpose, the engine RPM $N_E$ corresponding to the input torque is determined and the C-1 oil pressure $P_{C1}$ is regulated to correspond to the engine RPM $N_E$, and the C-1 oil pressure $P_{C1}$ is gradually lowered.

Incidentally, the input torque can be detected not only from the engine RPM $N_E$ but also indirectly from the engine air suction or the fuel injection rate. Moreover, the input torque of the speed change unit 16 can also be directly detected by the torque sensor (not shown). In this latter case, the torque sensor is attached to the output shaft 14 of the torque converter 12.

Step S2: An in-neutral control subroutine is executed to establish the neutral control state. In this step, stabilization of the engine RPM $N_E$ and the clutch input side RPM $N_{C1}$ is awaited. After these stabilizations, the C-1 oil pressure $P_{C1}$ is raised or lowered by set pressures according to the two RPMs.

Step S3: The booster means 105 executes first clutch application control. In this step, the C-1 oil pressure $P_{C1}$ is incrementally raised by a set pressure which is set on the basis of the throttle opening θ and the engine RPM $N_E$, to complete the stroke of the piston in hydraulic servo C-1 (FIG. 5). After the end of the piston stroke of the hydraulic servo C-1, the C-1 oil pressure $P_{C1}$ is raised by set pressures to prevent application shock.

Figure 8:
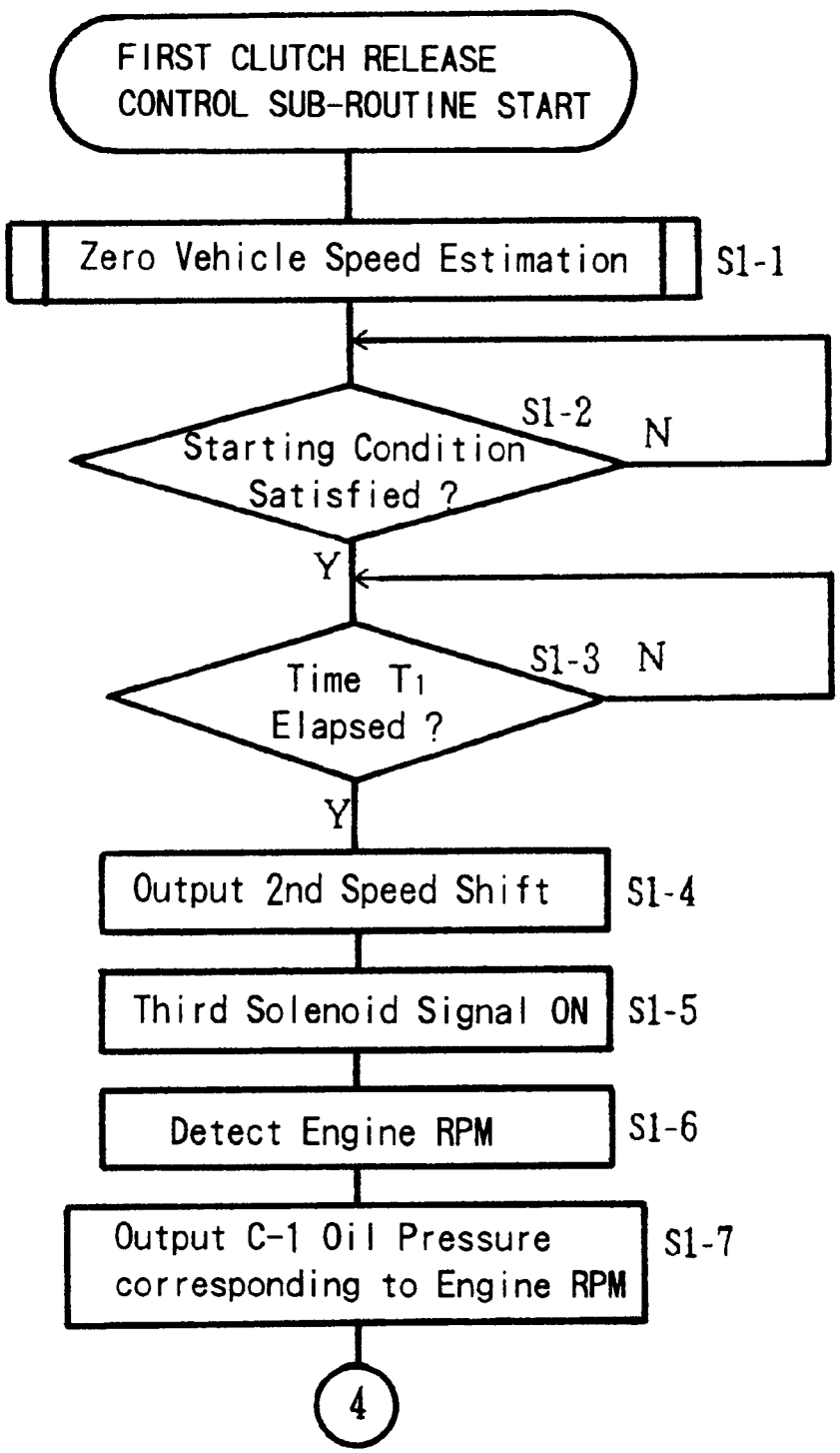
FIG. 8 is a partial flow chart of the first clutch release control subroutine of step S1 in the main routine of FIG. 6.
Figure 9:
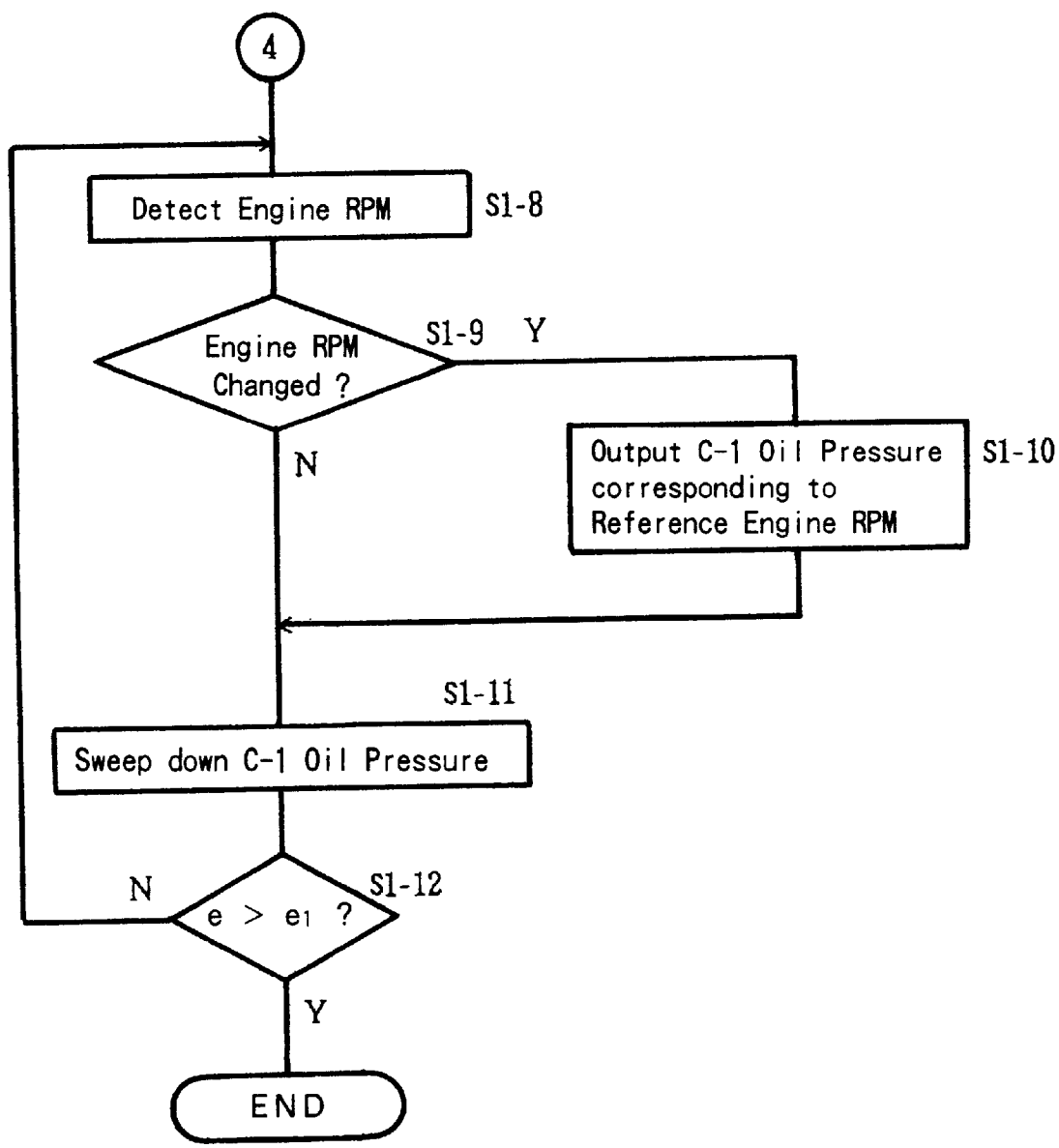
FIG. 9 is the remainder of the flow chart of FIG. 8.
Figure 10:
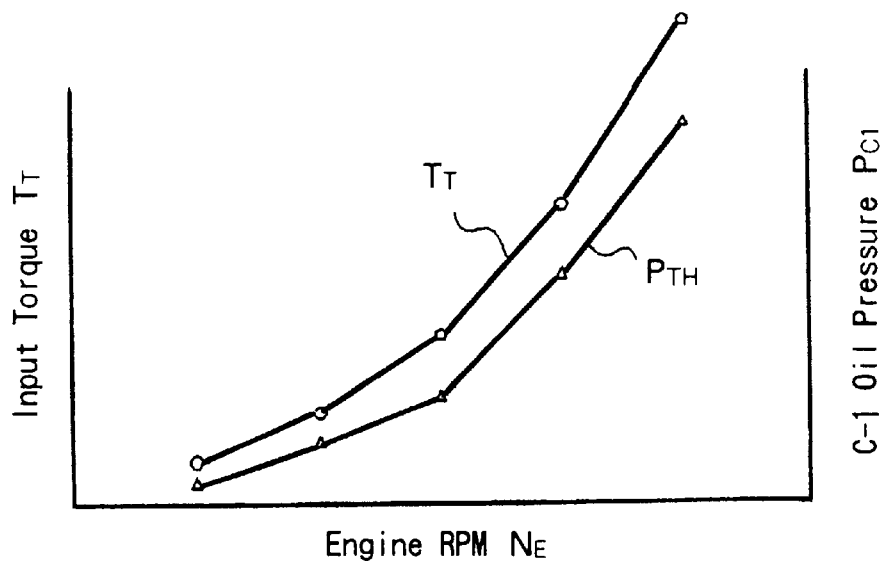
FIG. 10 is a graph wherein the abscissa indicates the engine RPM $N_E$, and the ordinate indicates the intake torque $T_T$ ($=t \cdot C \cdot N_E^2$) and the C-1 oil pressure $P_{C1}$.

Next, the first clutch release control sub-routine executed in Step S1 in the routine of FIG. 6 will be described with reference to FIGS. 8 to 10.

Step S1-1: The zero vehicle speed is estimated on the basis of the variation of the clutch input side RPM $N_{C1}$.

Step S1-2: The satisfaction of the starting condition for the neutral control is awaited. At the same time, the timing of the first timer (not shown) is started.

In step S1-2, it is decided that the starting condition is satisfied, if all the following individual conditions are satisfied: that the clutch input side RPM $N_{C1}$ is substantially zero; that the accelerator pedal (not shown) is released so that the throttle opening θ is less than a predetermined value; that the oil temperature detected by the oil temperature sensor 46 (FIG. 2) is higher than a predetermined value; and that the brake pedal (not shown) is depressed so that the brake switch 48 is ON. Incidentally, whether or not the clutch input side RPM $N_{C1}$ is substantially zero is decided depending upon whether or not the detection limit of the RPM sensor 47 is reached. In the present embodiment, it is decided that the detection limit is reached when the actual vehicle speed reaches a predetermined (set) value, e.g. 2 km/h.

Step S1-3: Lapse of a time period $T_1$, as measured by the first timer, is awaited. In this case, the time period $T_1$ is calculated in the zero vehicle speed estimation step, and zero vehicle speed is estimated for when the time period $T_1$ elapses.

Step S1-4: the 2nd-speed shift signal for starting the hill-hold control is generated, and the first solenoid signal $S_1$ for opening/closing the first solenoid valve S1 (FIG. 4) is turned ON to feed the oil pressure to the hydraulic servo B-2 to thereby apply the second brake B2. As the oil pressure in the hydraulic servo B-2 rises, the sequence pressure in the hydraulic servo B-2 is fed to the B-1 sequence valve 56 (FIG. 5), causing oil pressure to be fed to the hydraulic servo B-1, thereby applying the first brake D1.

Thus, hill-hold control is executed to establish the 2nd-speed gear stage in the speed change unit 16 so that the first clutch C1, the first brake B1, the second brake B2 and the fourth brake B4 are applied to lock the one-way clutches F1 and F3. If the vehicle were to move backward while facing uphill in this state, reverse rotation would be transmitted to the output shaft 23 of the auxiliary transmission 19 to rotate the ring gear $R_1$ forward. However, this forward rotation is blocked by the one-way clutch F2 so that the vehicle cannot move backward.

Step S1-5: The third solenoid signal $S_3$ is turned ON to switch the neutral relay valve 64 to the upper half position to thereby bring the C-1 oil pressure $P_{C1}$ into a controllable state.

Step S1-6: As shown in FIG. 10, the engine RPM $N_E$ corresponding to the input torque $T_T$ is detected to set the value of the engine RPM $N_E$ to a reference engine RPM $N_{Em}$.

Step S1-7: The C-1 oil pressure $P_{C1}$, immediately before the first clutch C1 is released according to the engine RPM $N_E$, is established and output.

Step S1-8: The engine RPM $N_E$ corresponding to the input torque $T_T$ is detected again.

Step S1-9: The engine RPM $N_E$ is compared with the reference engine RPM $N_{Em}$ to decide whether or not it has changed. The sub-routine advances to Step S1-10, if the answer of the comparison of the engine RPM $N_E$ with the reference engine RPM $N_{Em}$ is YES, but to Step S1-11 if NOT.

Step S1-10: When it is decided at Step S1-9 that the engine RPM $N_E$ has changed from the reference engine RPM $N_{Em}$ the value of the engine RPM $N_E$ is set as the reference engine RPM $N_{Em}$, and the C-1 oil pressure $P_{C1}$ corresponding to the new reference engine RPM $N_{Em}$ is established and output.

Step S1-11: The C-1 oil pressure $P_{C1}$ is lowered (or swept down) by set pressures $P_{THDOWN}$ for every lapse of a set time period $T_{DOWN}$, as expressed by the following formula:

$$P_{TH}=P_{TH}-P_{THDOWN}.$$

Step S1-12: After the release of the first clutch C1, the pressure reduction of Step S1-11 is continued until a speed ratio e ($=N_{C1}/N_E$) exceeds a constant $e_1$. When the speed ratio e exceeds the constant $e_1$, the pressure reduction of Step S1-11 is stopped to end the sub-routine. If the speed ratio e fails to exceed the constant $e_1$, the sub-routine returns to Step S1-8. Incidentally, the constant $e_1$ is set to 0.75, for example, based on the delay of the change in the clutch input side RPM $N_{C1}$, on the basis of which the oil pressure for releasing the first clutch C1 is controlled. Alternatively, the speed ratio e may be substituted by the clutch input side RPM $N_{C1}$.

Incidentally, the applied state of the first clutch C1 is detected by deciding whether or not the difference (hereinafter "rotational difference") $\Delta N$ between the engine RPM $N_E$, or the RPM at the input side of the torque converter 12, and the clutch input side RPM $N_{C1}$, or the RPM at the output side, has changed. The rotational difference $\Delta N$ does not change regardless of whether the first clutch C1 is completely applied or released. This makes it difficult to determine the status of clutch C1, i.e. applied or released.

By awaiting the speed ratio to exceed the constant $e_1$, therefore, it is possible to reliably establish the state immediately before the application of the first clutch C1 is started. Incidentally, the rotational difference $\Delta N$ is calculated by the automatic transmission control system 41.

Figure 11:
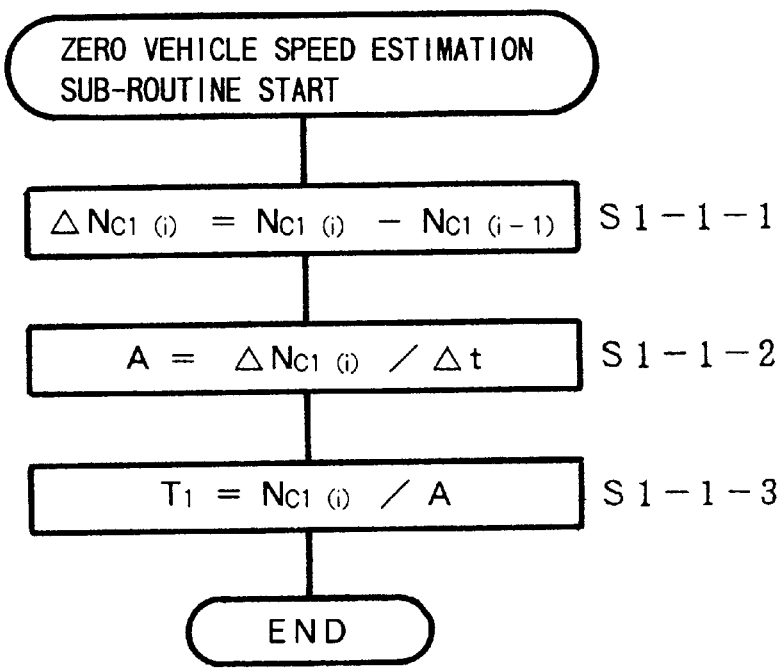
FIG. 11 is a flow chart of a zero vehicle speed estimating subroutine executed as step S1-1 in the flow chart of FIG. 8.

The sub-routine for zero vehicle speed estimation in Step S1-1 of FIG. 8 will now be described with reference to FIG. 11.

Step S1-1-1: RPM difference $N_{C1(i)}$ is calculated by subtracting clutch input side RPM $N_{C1(i-1)}$ at a time period t ago from the present clutch input side RPM $N_{C1(i)}$. In this case, the time period $\Delta t$ is set with the clock in the automatic transmission control system 41 (FIG. 2) so that the clutch input side RPM $N_{C1}$ is detected for every time period $\Delta t$.

Step S1-1-2: Deceleration A of the vehicle is calculated by dividing the RPM difference $\Delta N_{C1(i)}$ by the time period t.

Step S1-1-3: The time period $T_1$ until the vehicle reaches a stop state is calculated by dividing the present clutch input side RPM $N_{C1(i)}$ by the deceleration A.

Next, the relationships between the applied/released states of the first clutch C1 and the rotational difference $\Delta N$ will be described with reference to FIGS. 12 to 14.

Figure 12:
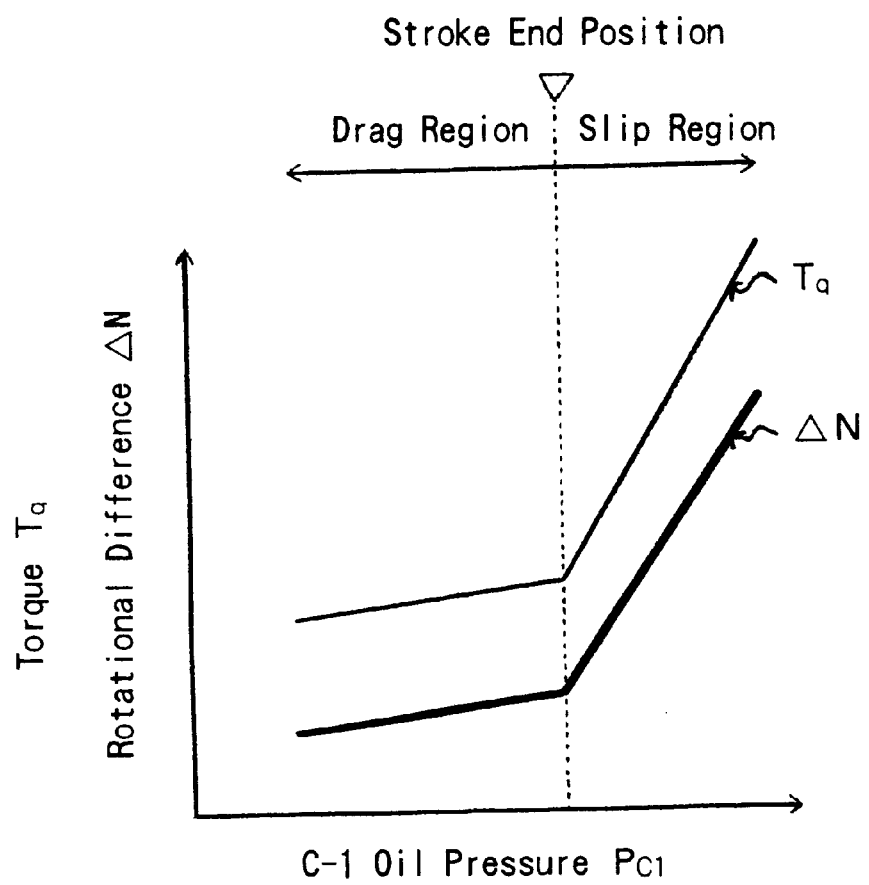
FIG. 12 is a graph of torque $T_q$ and rotational difference $\Delta N$ versus C-1 oil pressure $P_{C1}$ and serves to illustrate operation of the clutch in the present invention.

In FIG. 12, $T_q$ designates the torque to be transmitted from the engine 10 (FIG. 2) to the speed change unit 16 through the first clutch C1, and $\Delta N$ designates the rotational difference.

As the C-1 oil pressure $P_{C1}$ is gradually raised, as illustrated in FIG. 12, the torque $T_q$ increases so that the torque converter 12 is accordingly loaded to increase the rotational difference $\Delta N$.

By determining the rotational difference $\Delta N$, therefore, it is possible to distinguish between the applied/released states of the first clutch C1, i.e., the transmission state of the torque $T_q$.

When the application of the first clutch C1 is started from its completely released state by raising the C-1 oil pressure $P_{C1}$, the piston of the hydraulic servo C-1 reaches the position (hereinafter "stroke end position") at which the stroke has ended. When the C-1 oil pressure $P_{C1}$ is further raised, the first clutch C1 comes into the completely applied state. Hence, the region between the completely released state of the first clutch C1 and the arrival of the piston at the stroke end position is designated the drag region (or inoperative region) whereas the region between the arrival of the piston at the stroke end position and the completely applied state of the first clutch C1 is designated the slip region (or operative position).

In the drag region, the individual friction elements of the first clutch C1 are not in contact with each other. However, a small torque $T_q$ is transmitted through the first clutch C1 due to the viscosity characteristics of the oil present between the individual friction elements. Moreover, the torque $T_q$ gradually increases, as the stroke of the piston increases and the clearances (or gaps) between the friction elements decrease. In the drag region, also, the rotational difference $\Delta N$ rises according to the transmission of the torque $T_q$ and gradually increases as the torque $T_q$ increases.

In the slip region, on the other hand, the individual friction elements are in contact with each other so that a frictional force abruptly increases the torque. Moreover, the piston has already reached the stroke end position so that the oil in the hydraulic servo C-1 stops its flow but raises the C-1 oil pressure abruptly. As a result, the frictional force is accordingly increased to further increase the torque $T_q$. As a result of the abrupt increase in the torque $T_q$, moreover, the rotational difference $\Delta N$ abruptly increases.

The relationship between the amount (hereinafter "variation") $\delta$ of the rotational difference $\Delta N$ according to the change in the applied/released states of the first clutch C1 and the amount (hereinafter "rate of change") $\rho$ of the rotational difference $\Delta N$ for the unit time period is as follows. If the rotational difference $\Delta N$ at the start of a sampling time $T_{SAM}$ is assumed to be a reference rotational difference $\Delta N_m$, the variation $\delta$ can be expressed by the difference between the rotational difference $\Delta N$ and the reference rotational difference $\Delta N_m$ at an arbitrary time. If the C-1 oil pressure $P_{C1}$ fed to the hydraulic servo C-1 is to be raised, the rotational difference $\Delta N$ changes gradually in the drag region but abruptly in the slip region, as described above. As a result, the variation $\delta$ in the rotational difference $\Delta N$ is small in the drag region but large in the slip region. Moreover, the rate of change $\rho$ the rotational difference $\Delta N$ is also low in the drag region but high in the slip region.

Noting that the rate of change $\rho$ is different in the drag region than in the slip region, standard rates of change $\rho_1$ and $\rho_2$ for the drag region and the slip region, when the C-1 oil pressure $P_{C1}$ is raised, are determined to suitably select an intermediate value between the two rates of change $\rho_1$ and $\rho_2$, and this intermediate value is set as a reference rate of change $\rho_{REF}$.

If this reference rate of change $\rho_{REF}$ is thus set, the rate of change $\rho$ while the first clutch C1 is in the drag region is always smaller than the reference rate of change $\rho_{REF}$, whereas the rate of change while the first clutch C1 is in the slip region is always larger than the reference rate of change $\rho_{REF}$.

By comparing the rate of change $\rho$ with the reference rate of change $\rho_{REF}$, therefore, it can be easily decided whether the first clutch C1 is in the drag region or in the slip region. Specifically, it can be decided, if the rate of change $\rho$ is lower than the reference value $\rho_{REF}$, that the first clutch C1 is in the drag region and, if the rate of change $\rho_{REF}$ is higher than the reference value $\rho_{REF}$, that the first clutch C1 is in the slip region.

On the basis of this decision, moreover, it is possible to hold the state immediately before the first clutch C1 makes the transition from the drag region to the slip region.

When the in-neutral control is started, the automatic transmission control system 41 lowers the C-1 oil pressure $P_{C1}$ until at least when the piston of the hydraulic servo C-1 starts its retraction, so that the first clutch C1 is transferred from the slip region to the drag region.

Subsequently, the C-1 oil pressure $P_{C1}$ is so controlled that the rate of change ρ of the rotational difference ΔN does not exceed the reference rate of change $ρ_{REF}$. Here, in the present embodiment, when the rate of change ρ and the reference rate of change $ρ_{REF}$ are compared, the comparison is not direct but, rather, between the variation δ of the rotational difference ΔN for a set time period and the threshold value corresponding to the reference rate of change $ρ_{REF}$.

Figure 13:
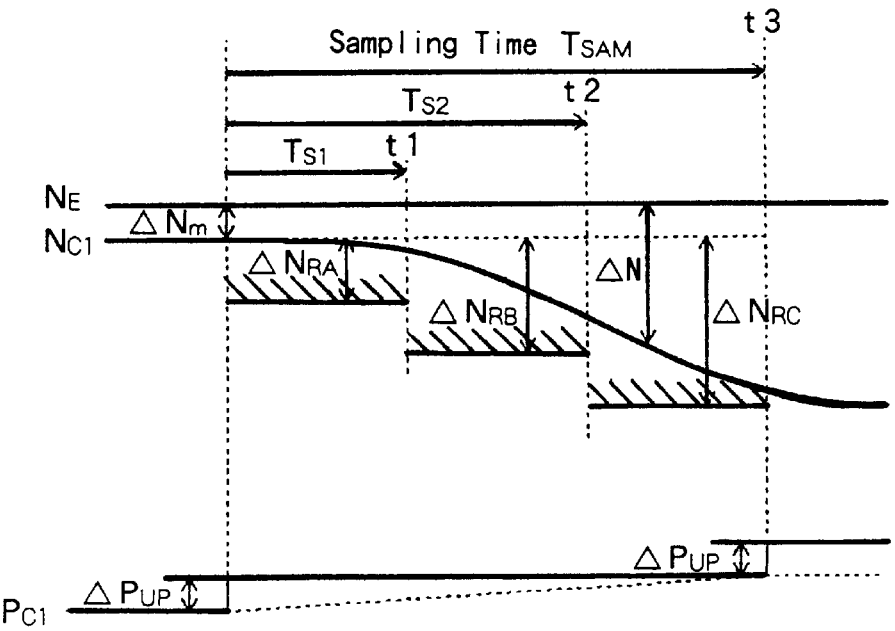
FIG. 13 is a time chart of operation of the first clutch in the drag region.
Figure 14:
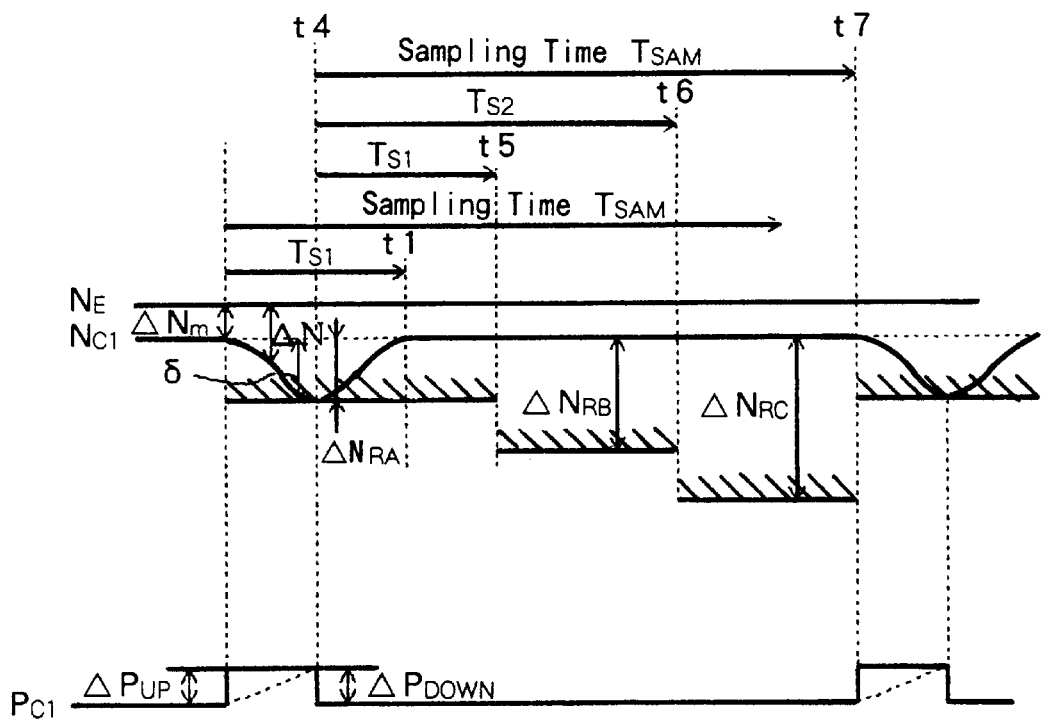
FIG. 14 is a time chart of operation of the first clutch in the slip region.

As shown in FIGS. 13 and 14, moreover, the aforementioned set time periods include, not only the sampling time $T_{SAM}$, but also the time periods $T_{S1}$ and $T_{S2}$ which are obtained by dividing the sampling time $T_{SAM}$ into three. If the times at which the time periods $T_{S1}$ and $T_{S2}$ and the sampling time $T_{SAM}$ elapse after the start of application of the first clutch C1 are designated as $t_1$ to $t_3$, respectively, the individual threshold values $ΔN_{Ri}$ (i=A, B and C) of the times $t_1$ to $t_3$ are expressed, as follows:

$$Δ_{RA}=ρ_{REF} \cdot T_{S1};$$

$$ΔRB=ρ_{REF} \cdot T_{S2};$$

and $$Δ_{RC}=ρ_{REF} \cdot T_{SM}.$$

Since the rate of change ρ is low in the drag region, the threshold value $ΔN_{Ri}$ is not exceeded at the individual times $t_1$ to $t_3$, as seen in FIG. 13, even if the variation δ of the rotational difference ΔN increases as the time elapses. Therefore, the automatic transmission control system 41 raises the C-1 oil pressure $P_{C1}$ by set pressures $ΔP_{UP}$, as the sampling time $T_{SAM}$ elapses, to transfer the applied/released states of the first clutch C1 to the slip region side. Thus, the piston of the hydraulic servo C-1 is brought closer to the stroke end position each time the sampling time $T_{SAM}$ elapses.

When the piston reaches the stroke end position so that the first clutch C1 transfers to the slip region, the rate of change ρ the rotational difference ΔN exceeds the reference rate of change $ρ_{REF}$.

As shown in FIG. 14, for example, after the start of the application of the first clutch C1, the variation δ of the rotational difference ΔN exceeds a threshold value $N_{RA}$ at a time t4, prior to lapse of the time period $T_{S1}$. Therefore, the automatic transmission control system 41 decides that the first clutch C1 has transferred from the drag region to the slip region at time t4 (i.e., at the instant when it is decided by the control program of the automatic transmission control system 41 that the variation δ has exceeded the threshold value $N_{RA}$), and lowers the C-1 oil pressure $P_{C1}$ by set pressures $ΔP_{DOWN}$. At this time t4, the sampling time $T_{SAM}$ is reset. If, in this case, the time periods $T_{S1}$ and $T_{S2}$ and the sampling time period $T_{SAM}$ end after time t4 and are respectively designated by t5 to t7, the threshold value $ΔN_{Ri}$ is set at each of the times t5 to t7.

Thus, the C-1 oil pressure $P_{C1}$ is lowered when the first clutch C1 transfers from the drag region to the slip region, and the first clutch C1 is always held in the state immediately preceding transfer from the drag region to the slip region.

Since the individual friction elements of the first clutch C1 hardly contact each other, the torque $T_q$ transmitted from the engine 10 to the speed change unit 16 is extremely reduced. This makes it possible not only to improve the fuel economy but also to prevent any idle vibration in the vehicle. It is further possible to prevent the individual friction elements of the first clutch C1 from being heated to reduce their useful service life.

Moreover, since the piston of the hydraulic servo C-1 is held immediately ahead of the stroke end position, the lost stroke of the piston can be reduced. This makes it possible to prevent any delay in application, as might otherwise be caused by the lost stroke. As a result, it is possible to prevent racing and application shock of the engine 10.

In the aforementioned drag region, the variation δ of the rotational difference ΔN does not exceed the threshold value $ΔN_{Ri}$ so that the automatic transmission control system 41 raises the C-1 oil pressure $P_{C1}$ by the set pressure $P_{UP}$ upon each lapse of the sampling time $T_{SAM}$, to transfer the applied/released states of the first clutch C1 to the side of the slip region. However, the rise of the actual C-1 oil pressure $P_{C1}$ in the hydraulic servo C-1 is delayed by the viscous resistance of the oil when the C-1 oil pressure $P_{C1}$ is raised by the set pressure $ΔP_{UP}$.

In the previous decision, it may erroneously appear that the variation δ does not exceed the threshold value $ΔN_{Ri}$ if a delay is left in the rise of the C-1 oil pressure $P_{C1}$ at the instant of lapse of the sampling time $T_{SAM}$, after the C-1 oil pressure $P_{C1}$ has been raised by the set pressure $ΔP_{UP}$. Since, in this case, the C-1 oil pressure $P_{C1}$ is raised prematurely, i.e. earlier than necessary, by the set pressure $ΔP_{UP}$, the delays in the rise of the C-1 oil pressure $P_{C1}$ are accumulated to cause overshooting in transfer from the drag region to the slip region.

Moreover, the piston is retracted more than necessary if the sampling time $T_{SAM}$ is longer than necessary.

Therefore, this sampling time $T_{SAM}$ is set to correspond to the time period necessary for the end of the actual change in the C-1 oil pressure $P_{C1}$ when the C-1 oil pressure $P_{C1}$ is raised by the set pressure $ΔP_{UP}$, so that the C-1 oil pressure $P_{C1}$ may be raised at the proper time instants.

Thus, the C-1 oil pressure $P_{C1}$ is raised by the set pressure $ΔP_{UP}$ after the delay in its rise has ended. As a result, no accumulation of delays results and overshooting at the time the first clutch C1 transfers from the drag region to the slip region is prevented. Moreover, the piston of the hydraulic servo C-1 can be prevented from retracting more than necessary.

Figure 15:
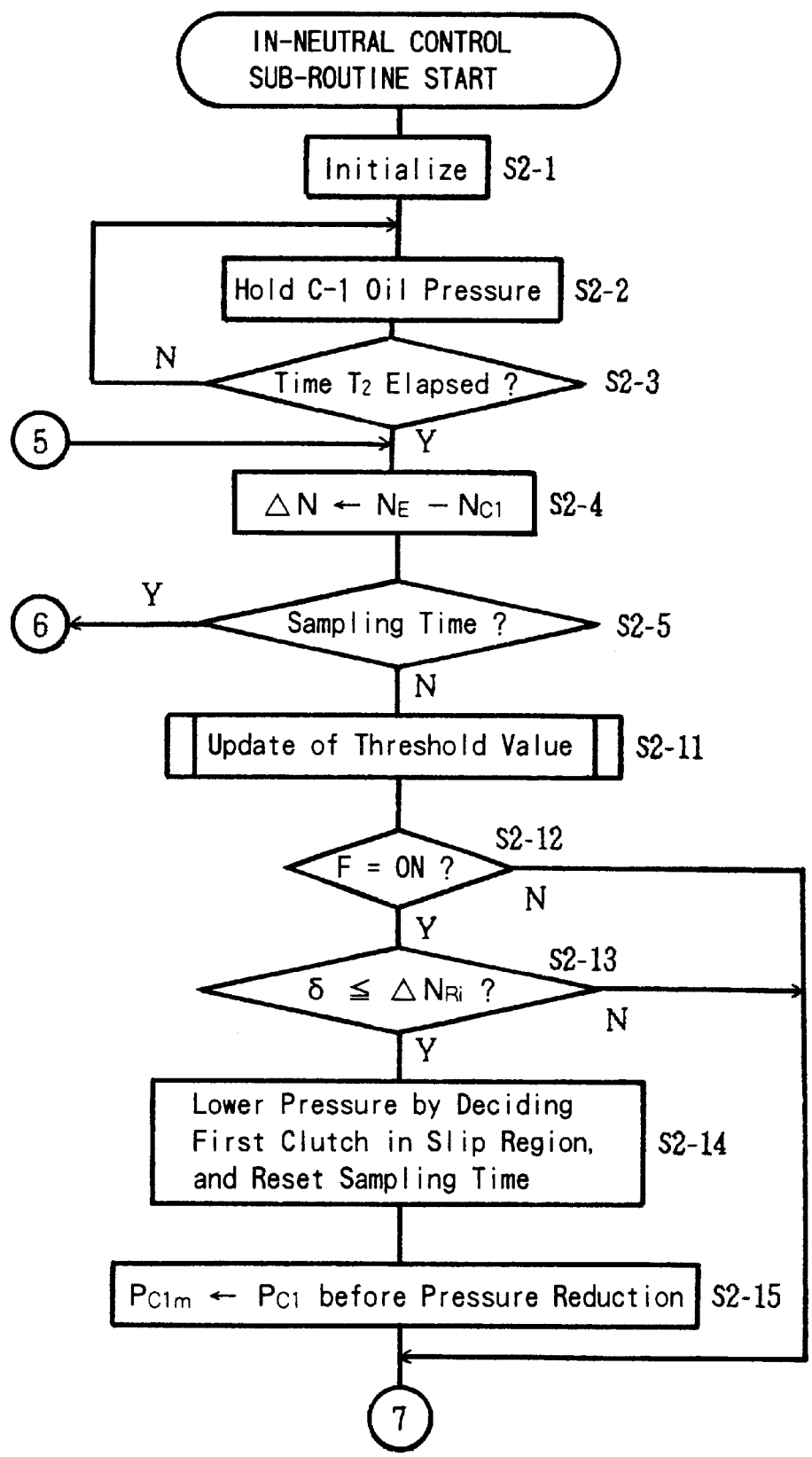
FIG. 15 is a partial flow chart of an in-neutral control subroutine executed as step S2 in the main routine of FIG. 6.
Figure 16:
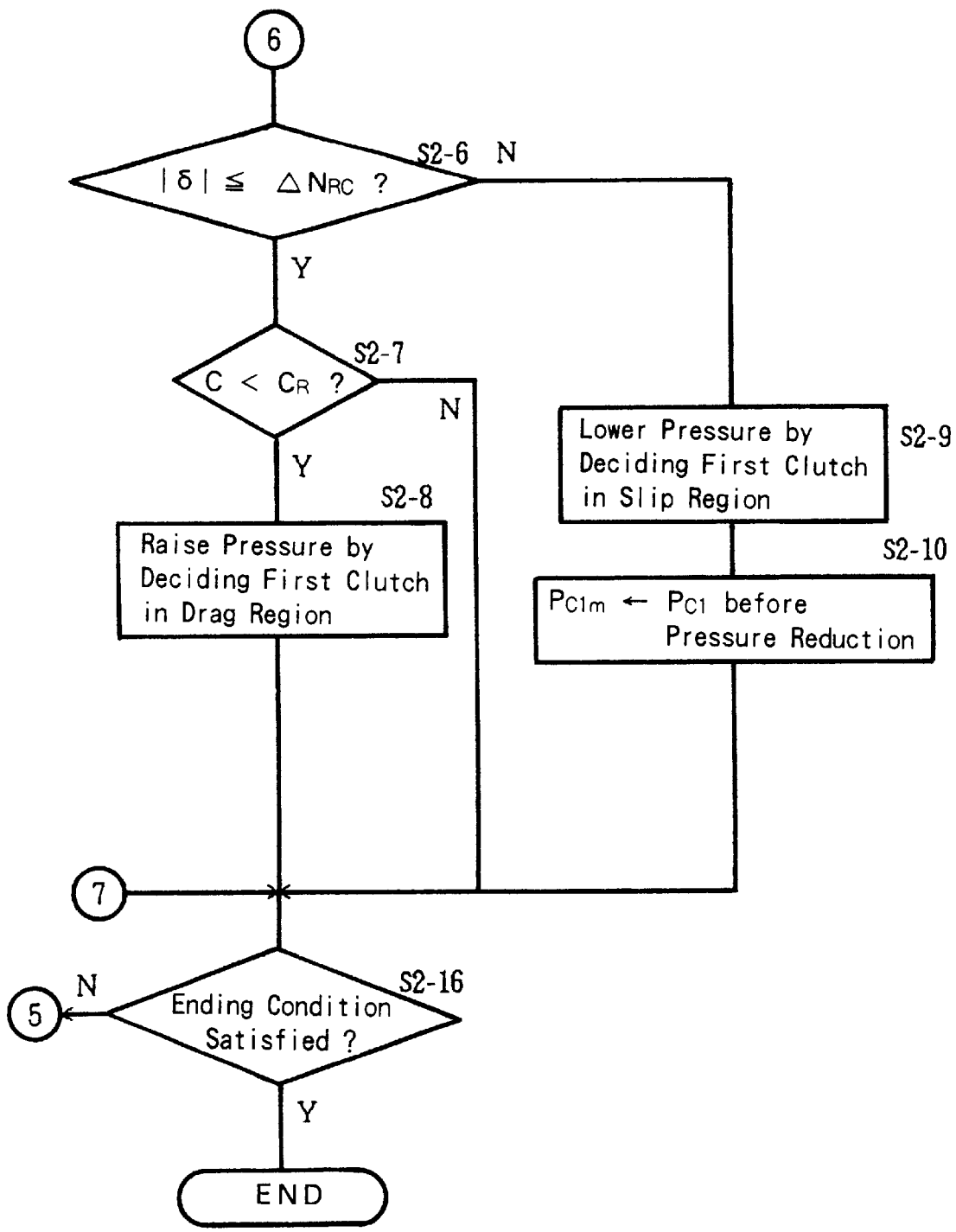
FIG. 16 is a continuation of the flow chart of FIG. 15.

The in-neutral control sub-routine of Step S2 executed in Step S2 of FIG. 6 will now be described with reference to FIGS. 15 and 16.

Step S2-1: The initial values of an oil pressure control flag F, a counted value C of the counter (not shown) and the reference rotational difference $ΔN_m$ are set, as follows:

F←OFF;

C←0;

and $ΔN_m$←the value of the rotational difference $ΔN(=N_E-N_{C1})$ at this time.

Steps S2-2 and S2-3: The C-1 oil pressure $P_{C1}$ is held at the final value in the first clutch releasing control subroutine. If the process for decision as to whether or not the rotational difference ΔN has changed is started immediately after it has been confirmed that the first clutch C1 is released to the predetermined states, an erroneous decision may be made by the change in the rotational difference ΔN, as caused by the pressure reduction in the first clutch release control routine. Therefore, a second timer (not shown) times lapse of a time period $T_2$, during which the C-1 oil pressure $P_{C1}$ is held. As a result, the decision as to whether or not the rotational difference $\Delta N$ has changed is delayed so that no attempt is made to control the C-1 oil pressure $P_{C1}$ during the unstable state which immediately follows release of the first clutch C1. The routine advances to Step S2-4 when the timer period T2 has elapsed.

Step S2-4: The rotational difference $\Delta N$ is calculated by subtracting the clutch input side RPM $N_{C1}$ from the engine RPM $N_E$.

Step S2-5: It is decided whether or not the predetermined time $T_{SAM}$, e.g. 1.0 secs or 0.5 secs has elapsed. The routine advances to Step S2-6, if the sampling time $T_{SAM}$ has elapsed, but to Step S2-11 if the sampling time $T_{SAM}$ has not elapsed.

Step S2-6: It is decided whether or not the difference between the rotational difference $\Delta N$ and the reference rotational difference $\Delta N_m$, i.e. the absolute value of the variation $\delta$, is below a threshold value $\Delta N_{RC}$. The routine advances to Step S2-7, if the absolute value of the variation $\delta$ is below the threshold value $\Delta N_{RC}$, but to Step S2-9 if the absolute value of the variation $\delta$ is over the threshold value $\Delta N_{RC}$.

Step S2-7: It is decided whether or not the counted value C is below a set value $C_R$. The routine advances to Step S2-8, if the counted value C is below the set value $C_R$, but to Step S2-16 is over the set value $C_R$.

Step S2-8: Since the absolute value of the variation $\delta$ is below the threshold value $\Delta N_{RC}$ even after the sampling time $T_{SAM}$ has elapsed, it is decided that the first clutch C1 is in the drag region, and the control system 41 raises (or boosts) the C-1 oil pressure $P_{C1}$ by the set pressure $\Delta P_{UP}$ at the instant when the sampling time $T_{SAM}$ elapses:

$$P_{C1} \leftarrow P_{C1} + \Delta P_{UP}.$$

Moreover, the rotational difference $\Delta N$ is set to the reference rotational difference $\Delta N_m$, and the oil pressure control flag F is turned ON:

$$\Delta N_m \leftarrow \Delta N;$$

and $$F \leftarrow ON.$$

Step S2-9: It is decided that the first clutch C1 is transferring from the drag region to the slip region. The C-1 oil pressure $P_{C1}$ is lowered (or reduced) by the set pressure $\Delta P_{DOWN}$ at the instant when the sampling time $T_{SAM}$ elapses:

$$P_{c1} \leftarrow P_{C1} - \Delta P_{DOWN};$$

Moreover, the rotational difference $\Delta N$ is set to the reference rotational difference $\Delta N_m$, and the oil pressure control flag F is turned OFF. At the same time, "1" is subtracted from the counted value C of the counter:

$$\Delta N_m \leftarrow \Delta N;$$

$$F \leftarrow OFF;$$

and $$C \leftarrow 1 (C=0 \text{ for } C<0).$$

If it is decided at Step S1-12 of the first clutch release subroutine that the speed ratio e exceeds the constant $e_1$, it is confirmed that the first clutch C1 is released to some extent. As a result, the first clutch release subroutine is ended, but the first clutch C1 is not released to the point where the piston of the hydraulic servo C-1 will start its retraction. This makes it necessary to lower the C-1 oil pressure $P_{C1}$ to the extent that the first clutch C1 may transfer from the slip region to the drag region. Thus, the operation of Step S2-9 is repeated until the first clutch C1 transfers from the slip region to the drag region.

Once the first clutch C1 has transferred from the slip region to the drag region, it is held in the state immediately preceding the transfer from the drag region to the slip region, so that the operation of Step S2-9 is not executed.

When the variation $\delta$ increases over the threshold value $\Delta N_{RC}$, the first clutch C1 can be released so long as the piston of the hydraulic servo C-1 starts its retraction without fail, by repeating the operation of lowering the C-1 oil pressure $P_{C1}$ by the set pressure $P_{DOWN}$.

Step S2-10: The C-1 oil pressure $P_{C1}$ before the pressure reduction at Step S2-9 is set as a reference C-1 oil pressure $P_{C1}$, and is stored in memory:

$$P_{C1m} \leftarrow P_{c1} \text{ before the pressure reduction.}$$

Step S2-11: The threshold value $\Delta N_{Ri}$ is updated.

Step S2-12: It is decided whether or not the oil pressure control flag F is ON, that is, whether or not the C-1 oil pressure $P_{C1}$ is raised at the instant of lapse of the previous sampling time $T_{SAM}$. The subroutine advances to Step S2-13, if the oil pressure control flag F is ON, but to Step S2-16 if the oil pressure control flag F is OFF.

Step S2-13: Since the C-1 oil pressure $P_{C1}$ is raised by the set pressure $\Delta P_{UP}$ (because the oil pressure control flag F is ON) at the instant of lapse of the previous sampling time $T_{SAM}$, it is decided whether or not the variation $\delta$, or the remainder obtained by subtracting the rotational difference $\Delta N$ from the reference rotational difference $\Delta N_m$, is below the threshold value $\Delta N_{Ri}$. The routine advances to step S2-14, if the variation $\delta$ is below the threshold value $\Delta N_{Ri}$, but to Step S2-16 if the variation $\delta$ is over the threshold value $\Delta N_{Ri}$.

Step S2-14: Because the C-1 oil pressure $P_{C1}$ is raised by the set pressure $\Delta P_{UP}$ at the instant of lapse of the previous sample time $T_{SAM}$, the rotational difference $\Delta N$ has highly changed. It is, therefore, decided that the first clutch C1 has transferred from the drag region to the slip region, and the C-1 oil pressure $P_{C1}$ is lowered (or reduced) by the set pressure $\Delta P_{DOWN}$ at the later-described instant of Step S2-16:

$$P_{C1} \Delta P_{C1} \Delta \leftarrow P_{DOWN}.$$

Moreover, the sampling time $T_{SAM}$ is reset, and the oil pressure control flag F is turned OFF. At the same time, the value "1" is added to the counted value C of the counter:

$$\Delta N_m \Delta \Delta N;$$

$$F \leftarrow OFF;$$

and $$C \leftarrow C+1.$$

If, in this time, the C-1 oil pressure $P_{C1}$ is lowered by the set pressure $\Delta P_{DOWN}$, the first clutch C1 assumes the state immediately preceding the transfer form the drag region to the slip region. It is, therefore, desirable that the C-1 oil pressure $P_{C1}$ be raised again by the set pressure $\Delta P_{UP}$ at the instant when the varied C-1 oil pressure $P_{C1}$ is stabilized by lowering it by the set pressure $P_{DOWN}$. Therefore, it is determined that the C-1 oil pressure $P_{C1}$ has been lowered by the set pressure $\Delta P_{DOWN}$. At the instant of this detection, the sampling time $T_{SAM}$ is reset to again start the timing.

Thus, the C-1 oil pressure $P_{C1}$ is raised early by the set pressure $\Delta P_{UP}$ after it has been lowered by the set pressure $\Delta P_{DOWN}$, so that the first clutch C1 can be always held in the state which immediately precedes transfer from the drag region to the slip region.

Incidentally, if the reduction of the C-1 oil pressure $P_{C1}$ is detected when the variation $\delta$ exceeds the threshold value $\delta N_{RC}$ after the sampling time $T_{SAM}$ has been reset, the operation of Step S2-9 is executed so that the C-1 oil pressure $P_{C1}$ is further lowered.

When the C-1 oil pressure $P_{C1}$ is lowered by the set pressure $\Delta P_{DOWN}$, the reference rotational difference $\Delta N_m$ is not set. Hence, the variation $\delta$ is the difference between the rotational difference $\Delta N$ and the reference rotational difference $\Delta N_m$ preceded by one, so that it is substantially zero. Hence, the C-1 oil pressure $P_{C1}$ can be raised by the set pressure $\Delta P_{UP}$ after it has been lowered by the set pressure $\Delta P_{DOWN}$. As a result, the operation of Step S2-9 is hardly ever executed.

Step S2-15: The C-1 oil pressure $P_{C1}$ before lowered at Step S2-14 is set as the reference C-1 oil pressure $P_{C1m}$ and is stored in the memory:

$$P_{C1m} \leftarrow P_{C1} \text{ before lowered.}$$

Step S2-16: It is decided whether or not the condition for ending the in-neutral control of the first clutch C1 is satisfied. The in-neutral control subroutine is ended, if the ending condition is satisfied, but is returned to Step S2-4 to repeat the aforementioned operation, if the ending condition is not satisfied.

Figure 17:
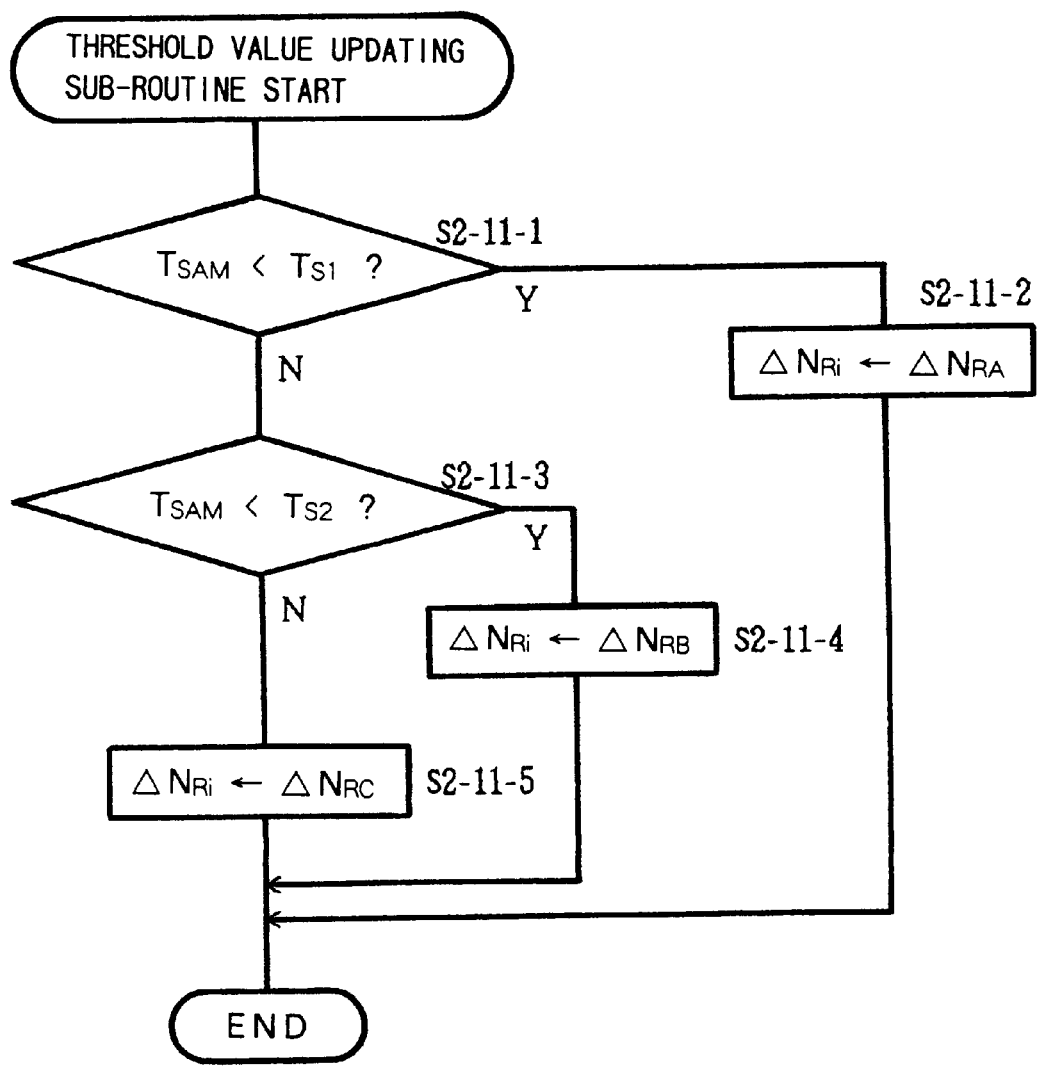
FIG. 17 is a flow chart of a threshold value updating subroutine executed as step S2-11 in the subroutine of FIG. 15.

Next, the sub-routine for updating the threshold value $\Delta N_{Ri}$ at Step S2-11 of FIG. 15 will be described with reference to FIG. 17.

In the present embodiment: a threshold value $\Delta N_{RA}$ is set to 15 rpm; a threshold value $\Delta N_{RB}$ is set to 20 rpm; and a threshold value $\Delta N_{RB}$ is set to 30 rpm.

Step S2-11-1: It is decided whether or not a time period (hereinafter "elapsed time") $T_{SAM}$ as elapsed from the start of timing of the sampling time $T_{SAM}$, is shorter than the time $T_{S1}$. The routine advances to Step S2-11-2, if the elapsed time $T_{SAM}$ is shorter than the time $T_{S1}$, but to Step S2-11-3 if the elapsed time $T_{SAM}$ is longer than the time $T_{S1}$.

Step S2-11-2: The value $\Delta N_{RA}$ is set as the threshold value $\Delta N_{Ri}$.

Step S2-11-3: It is decided whether or not the elapsed time $T_{SAM}$ is shorter than the time $T_{S2}$. The routine advances to Step S2-11-4, if the elapsed time $T_{SAM}$ is shorter than the time $T_{S2}$, but to Step S2-11-5 if the elapsed time $T_{SAM}$ is longer than the time $T_{S2}$.

Step S2-11-4: The value $\Delta N_{RB}$ is set as the threshold value $\Delta N_{Ri}$.

Step S2-11-5: The value $\Delta N_{RC}$ is set as the threshold value $\Delta N_{Ri}$.

Figure 18:
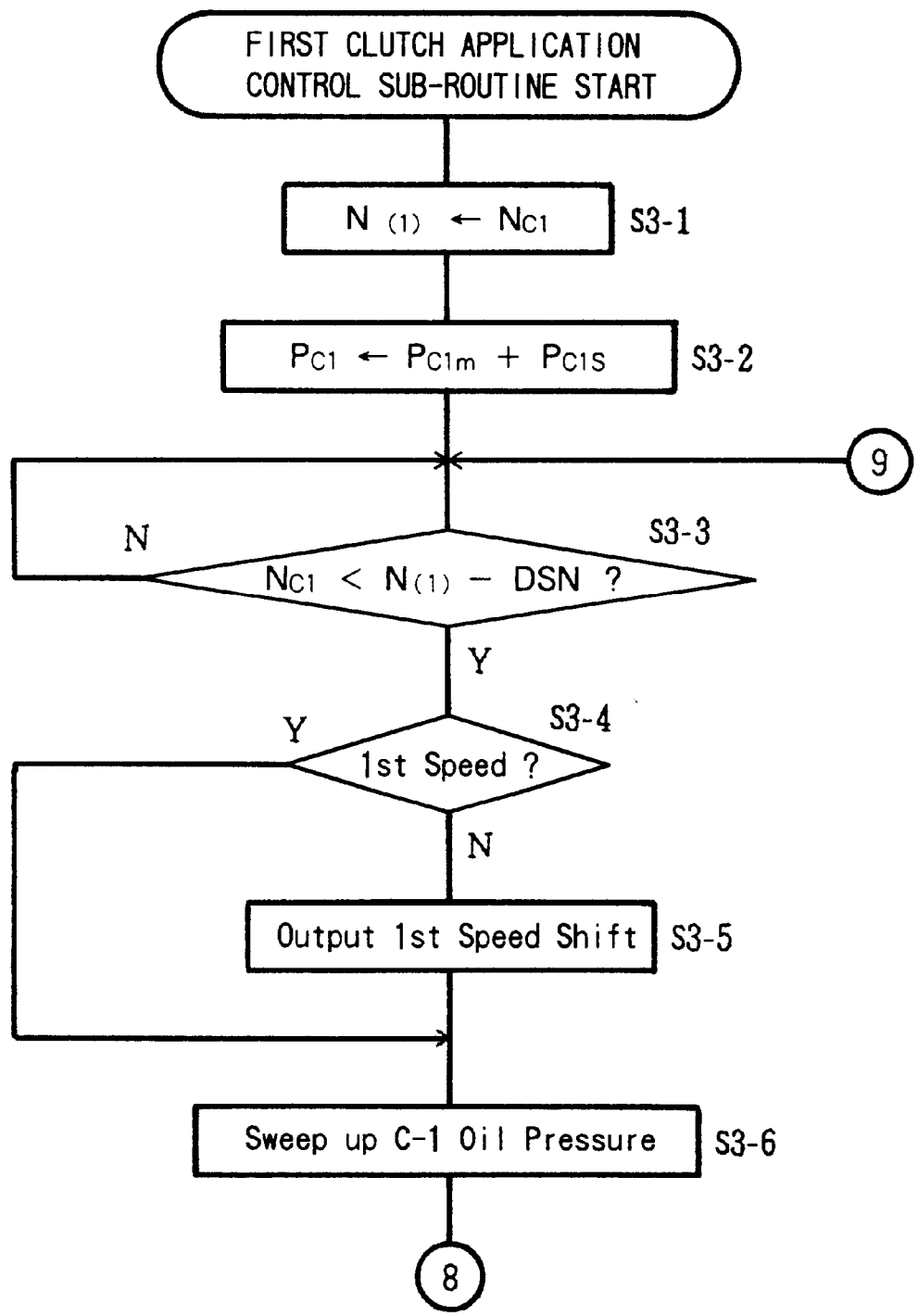
FIG. 18 is a partial flow chart of a first clutch application control sub-routine executed as step S3 in the main routine of FIG. 6.
Figure 19:
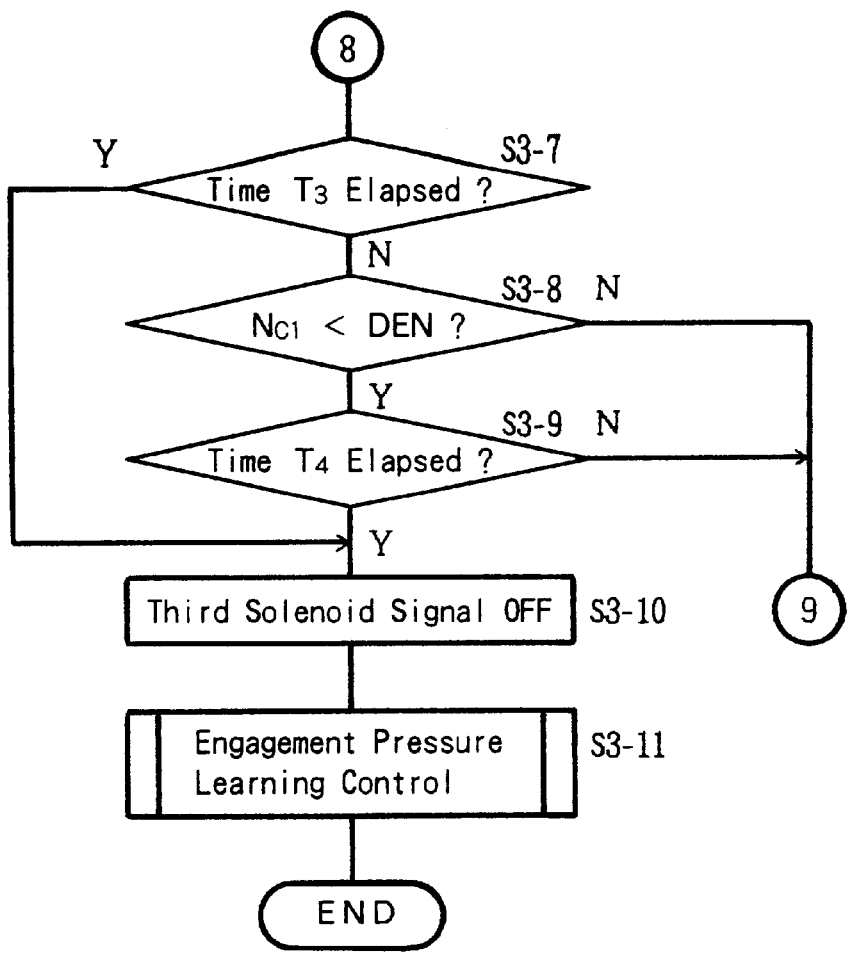
FIG. 19 is a continuation of the flow chart of FIG. 18.
Figure 20:
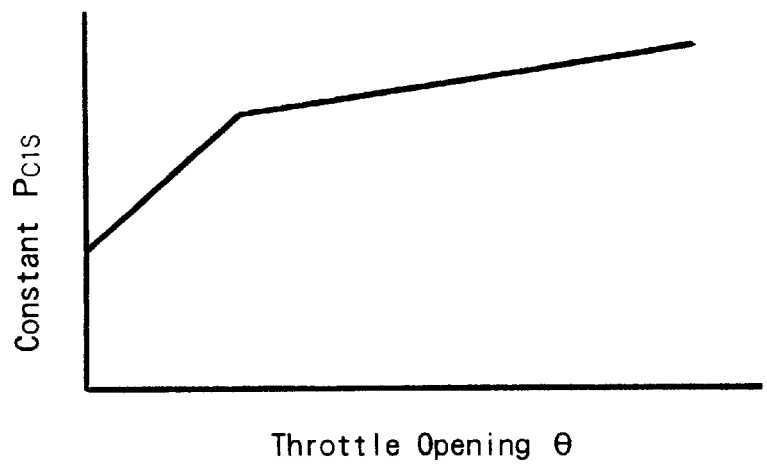
FIG. 20 is a graph of the relationship between constant $P_{C1S}$ (ordinate) and throttle opening $\theta$ (abscissa) in an embodiment of the present invention.

Next, the first clutch application control sub-routine executed at Step S3 of FIG. 6 will be described with reference to FIGS. 18 to 20.

Step S3-1: The clutch input side RPM $N_{C1}$ at the instant when the ending condition of the in-neutral control is satisfied is set and stored as a value $N_{(1)}$ in the memory of the automatic transmission control system 41 (FIG. 2). Simultaneously with this, the timing of the third timer is started.

Step S3-2: With reference to the map of FIG. 2, the constant $P_{C1S}$ is read in as the shelf pressure set to correspond to the throttle opening $\theta$. This constant $P_{C1S}$ is added as a shelf pressure to the reference C-1 oil pressure $P_{C1m}$ (base pressure) which is set at Steps S2-10 and S2-15, and this sum is set as the C-1 oil pressure $P_{C1}$ Incidentally, the constant $P_{C1S}$ is set to such a value which serves to move the piston of the hydraulic servo C-1 (FIG. 5) without fail and to weaken the application shock caused by application of the clutch.

When the driver operates the vehicle to start the vehicle in motion, the transfer of the vehicle from the stop state to the start state is detected and the constant $P_{C1S}$ is added to the reference C-1 oil pressure $P_{C1m}$ so that the oil pressure fed to the hydraulic servo C-1 is raised to bring the first clutch C1 into a partially applied state. Subsequently, the oil pressure fed to the hydraulic servo C-1 is further raised to bring the first clutch C1 into the completely applied state.

Step S3-3: The subroutine waits until the clutch input side RPM $N_{C1}$ becomes smaller than the remainder obtained by subtracting the value $N_{(1)}$ from a constant DSN. If the clutch input side RPM $N_{C1}$ becomes smaller than the difference between the value $N_{(1)}$ and the constant DSN, the routine decides the start of application of the first clutch C1 and advances to Step S3-4.

Step S3-4: It is decided whether or not the gear stage is at the 1st speed. The routine advances to Step S3-6, if at the 1st speed, but to Step S3-5 if not at the 1st speed.

Step S3-5: The 1st speed shift signal is generated.

Figure 7:
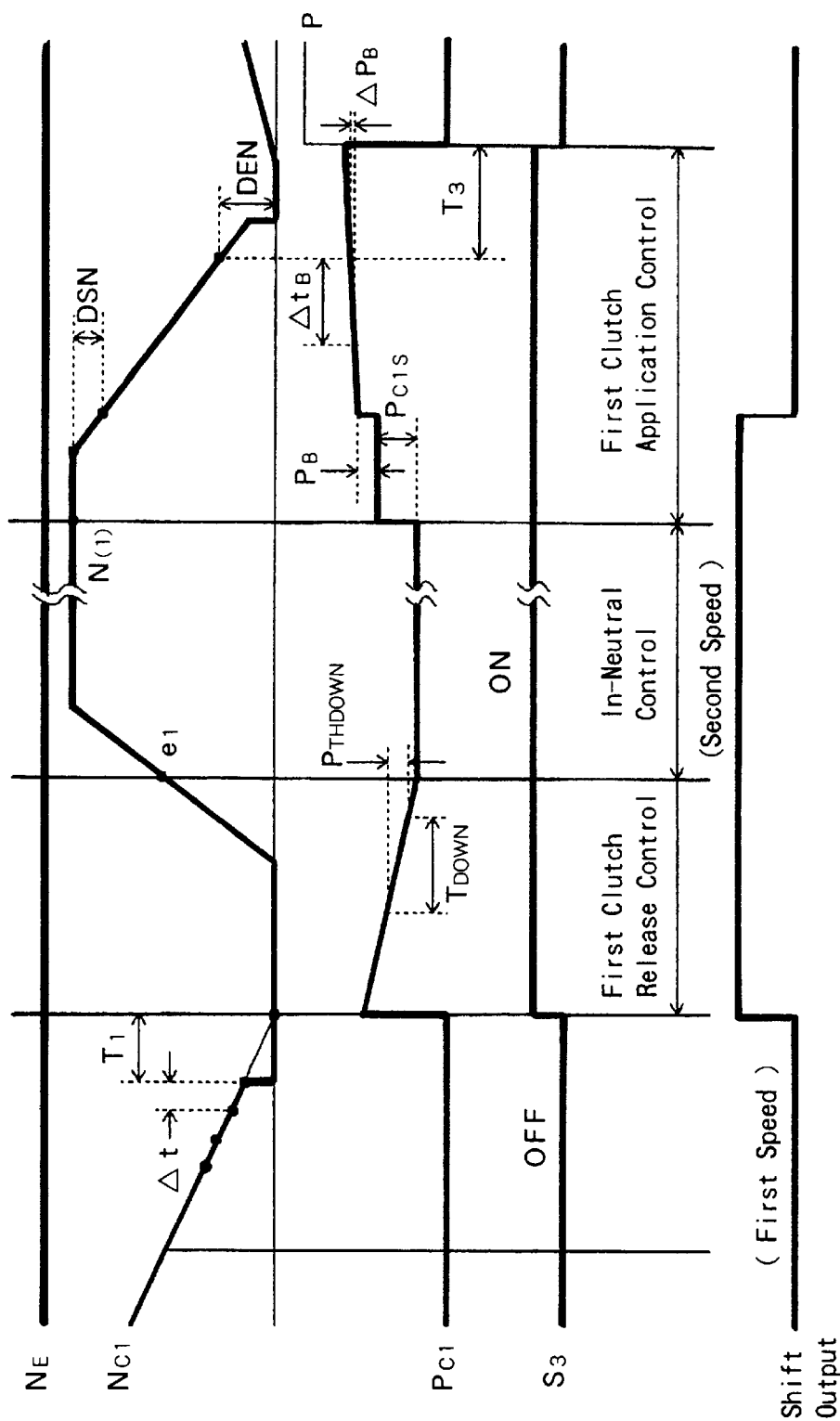
FIG. 7 is a time chart of operations of the control system for an automatic transmission in an embodiment of the present invention.

Step S3-6: The throttle pressure $P_{TH}$ from the linear solenoid valve 66 (FIG. 4) is changed to set the C-1 oil pressure $P_{C1}$ to set a pressure $P_B$ (FIG. 7), and this C-1 oil pressure $P_{C1}$ is then swept up. After this, the C-1 oil pressure $P_{C1}$ is raised by a set pressure $\Delta P_B$ at each lapse of a time $\Delta t_B$ to continue the application of the first clutch C1.

Step S3-7: It is decided whether or not a time period $T_3$, as timed by the third timer, has elapsed. The routine advances to Step S3-10, if the time period $T_3$ has elapsed, but to Step S3-8 if the time $T_1$ has not elapsed.

Step S3-8: It is decided whether or not the clutch input RPM $N_{C1}$ is below a constant DEN. The routine advances to Step S3-9, if the clutch input RPM $N_{C1}$ is over the constant DEN, but returns to Step S3-3 if the clutch input RPM $N_{C1}$ is below the constant DEN. Incidentally, if it is decided that the clutch input RPM $N_{C1}$ is below the constant DEN, the fourth timer starts its timing.

Step S3-9: It is decided whether or not a time period $T_4$, as timed by the fourth timer, has elapsed. The routine advances to Step S3-10, if the time period $T_4$ has elapsed, but returns to Step S3-3 if the time period $T_4$ has not elapsed.

In this case, the set values such as the constant $P_{C1S}$, the pressure $P_B$ and the set pressure $\Delta P_B$ are set on the basis of a variable such as the throttle opening $\theta$, as corresponding to the input torque $T_T$.

Step S3-10: The third solenoid signal S3 is turned OFF.

Step S3-11: For the next execution of the first clutch application sub-routine, the engagement pressure learning control is executed to correct the constant $P_{C1S}$.

In the first clutch engagement control sub-routine, the clutch input side RPM $N_{C1}$ is detected to start the sweep-up of the C-1 oil pressure $P_{C1}$ in a manner to correspond to the clutch input side RPM $N_{C1}$. However, when the clutch input side RPM $N_{C1}$ is used to determine when to end the in-neutral control and is relatively low, the time period, required for calculating the clutch input side RPM $N_{C1}$ by the RPM sensor 47, is prolonged, causing a delay in the detection.

Figure 21:
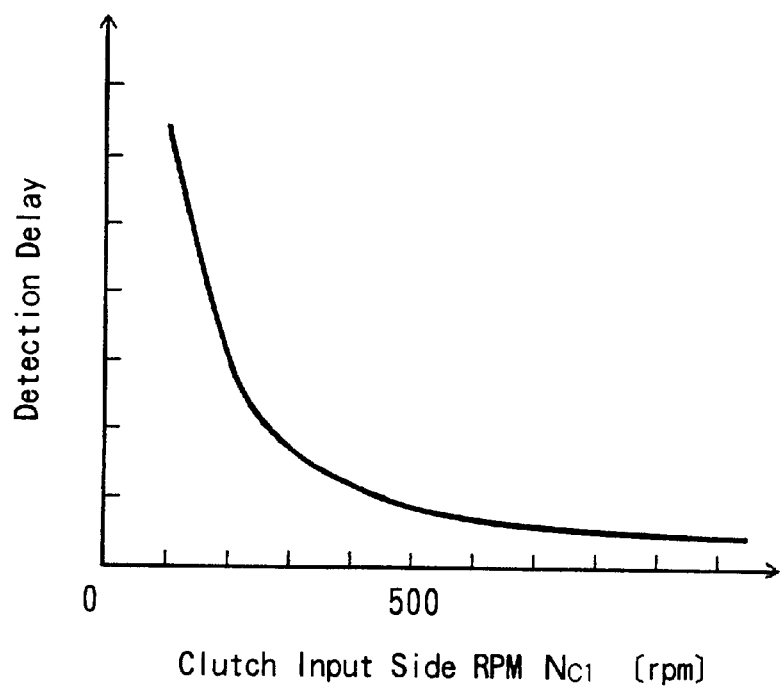
FIG. 21 is a graph (map) of detection delay of the RPM sensor versus clutch input side RPM $N_{C1}$ in an embodiment of the present invention.

FIG. 21 is a diagram explaining delay of the RPM sensor in the embodiment of the present invention. Incidentally, the abscissa of FIG. 21 indicates the clutch input side RPM $N_{C1}$, and the ordinate indicates the detection delay. As shown in FIG. 21 detection delay becomes larger as the clutch input side RPM $N_{C1}$, as detected by the RPM sensor 47 (FIG. 2), becomes lower. In the present embodiment, therefore, the rate of change in the clutch input side RPM $N_{C1}$ is detected, and the constant $P_{C1S}$ is corrected if the detected RPM change rate is different from the reference RPM change rate.

In the engagement pressure learning control, the individual values for oil temperature OT, engagement starting engine RPM $N_{ES}$ when the first clutch C1 starts its engagement, the engine RPM $N_E$, the engagement starting clutch input side RPM $N_{C1S}$ when the first clutch C1 starts its engagement, rise/drop repeating numbers $N_{CU}$ for the C-1 oil pressure $P_{C1}$ in the in-neutral control, the maximum $N_{C1A}$, the minimum $N_{C1B}$, RPM change rate $DN_i$ and average change rate $DN_{AV}$ are all stored in the memory so that they can be read out as necessary.

Figure 23:
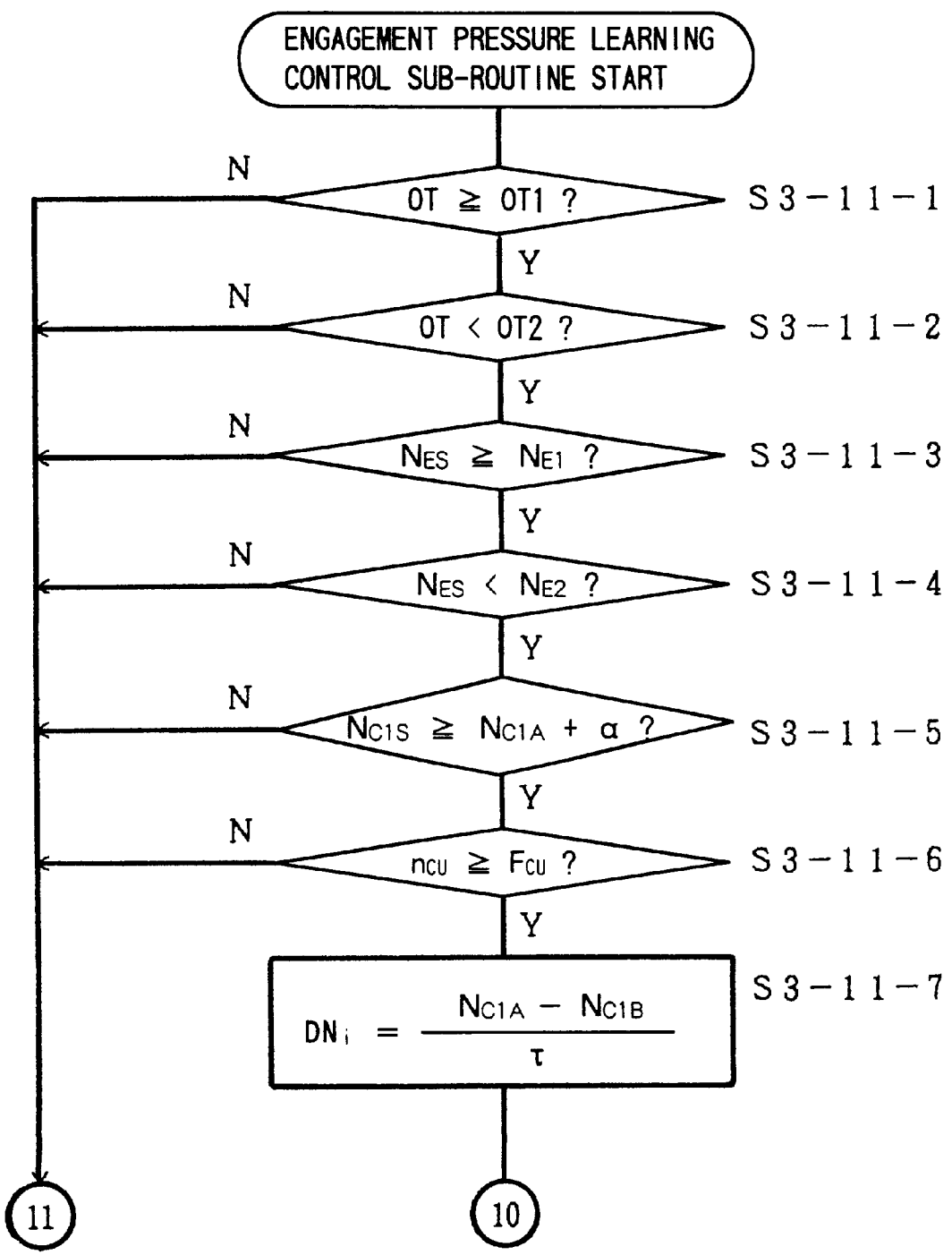
FIG. 23 is a partial flow chart illustrating the engagement pressure learning control routine in one embodiment of the present invention.
Figure 24:
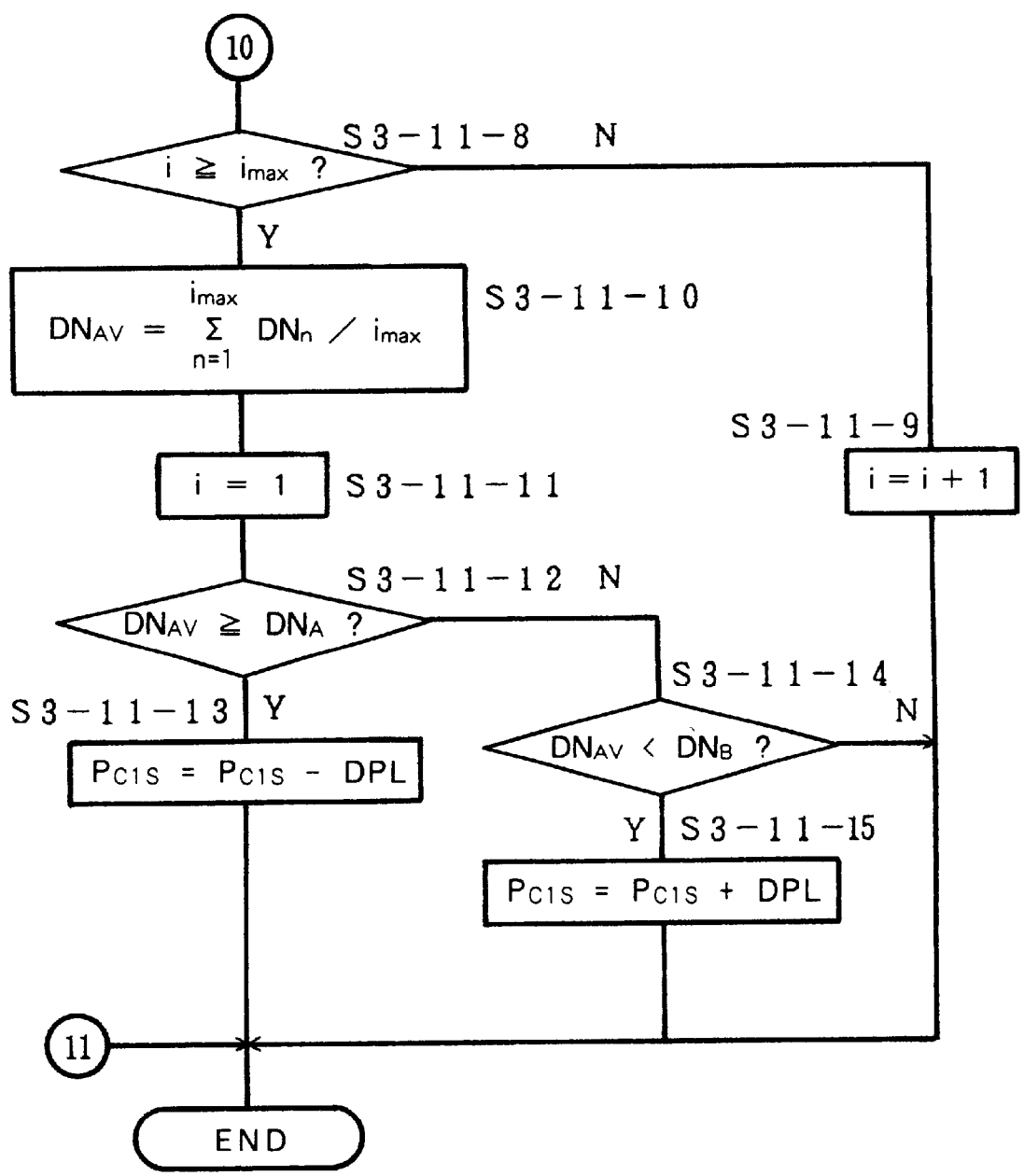
FIG. 24 is the remainder of the flow chart of FIG. 23.

The routine for engagement pressure learning control will now be described with reference to the flow chart of FIGS. 23 and 24.

Step S3-11-1: It is decided whether or not the oil temperature OP exceeds OT1. The subroutine advances to Step S3-11-2, if the oil temperature OT exceeds OT1, but is ended if the oil temperature OT is below OT1.

Step S3-11-2: It is decided whether or not the oil temperature OP is below OT2. The sub-routine advances to Step S3-11-3, if the oil temperature OT is below the level OT2, but is ended if the oil temperature OT is over OT2.

Step S3-11-3: It is decided whether or not the engine RPM $N_{ES}$ when the first clutch C1 starts its engagement is over a value $N_{S1}$. The sub-routine advances to Step S3-11-4, if the engine RPM $N_{ES}$ at the engagement starting time is over the value $N_{E1}$, but is ended if the engine RPM $N_{ES}$ at the engagement starting time is below the value $N_{E1}$.

Step S3-11-4: It is decided whether or not the engine RPM $N_{ES}$ when the first clutch C1 starts its engagement is below a value $N_{E2}$. The sub-routine advances to Step S3-11-5, if the engine RPM $N_{ES}$ at the engagement starting time is below the value $N_{E2}$, but is ended if the engine RPM $N_{ES}$ at the engagement starting time is over the value $N_{E2}$.

Step S3-11-5: Assuming the engaging characteristics are identical with the exception of the clutch input side RPM $N_{C1S}$ at the engagement starting time, if the RPM change rate $DN_i$ is uniformly detected as being between the maximum $N_{C1A}$ and the minimum $N_{C1B}$ of the clutch input side RPM $N_{C1}$, the different RPM change rates $DN_i$ are as indicated by the broken curves, even for the identical engaging characteristics. It is, therefore, decided whether or not the clutch input side RPM $N_{C1S}$ at the time when the first clutch C1 starts its engagement is over the sum of the maximum $N_{C1A}$ (later described) and a preset value α. The sub-routine advances to Step S3-11-6, if the clutch input side RPM $N_{C1S}$ at the engagement starting time is over the sum of the maximum $N_{C1A}$ and the preset value α, but is ended if the clutch input side RPM $N_{C1S}$ at the engagement starting time is below the sum of the maximum $N_{C1A}$ and the preset value α.

Figure 22:
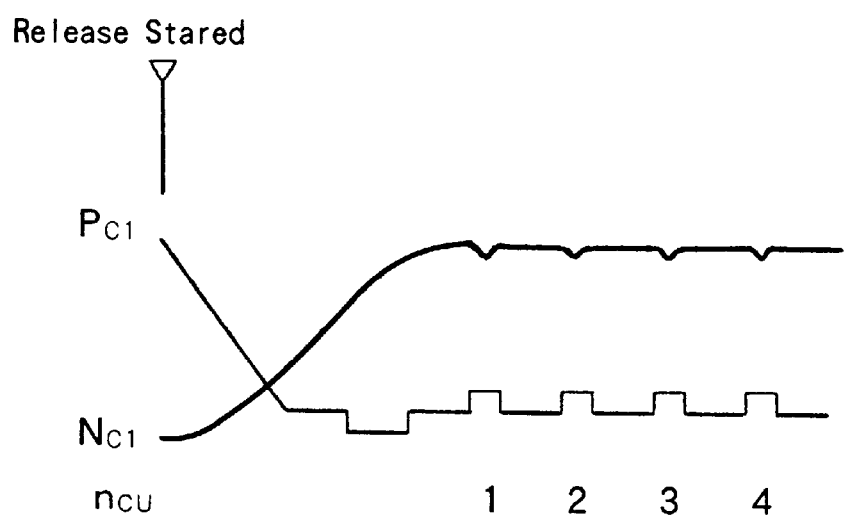
FIG. 22 is a time chart illustrating the number of oil pressure changes in an embodiment of the present invention.

Step S3-11-6: It is decided whether or not the number $n_{CU}$ of repeats of rise/drop in the C-1 oil pressure $P_{C1}$, in in-neutral control as shown in FIG. 22, is over a value $F_{CU}$. The sub-routine advances to Step S3-11-7, if the repetition number $n_{CU}$ is over the value $F_{CU}$, but is ended if the repetition number $n_{CU}$ is below the value $F_{CU}$. Incidentally, the first clutch C1 is substantially released if the repetition number $n_{CU}$ is over the value $F_{CU}$.

Figure 25:
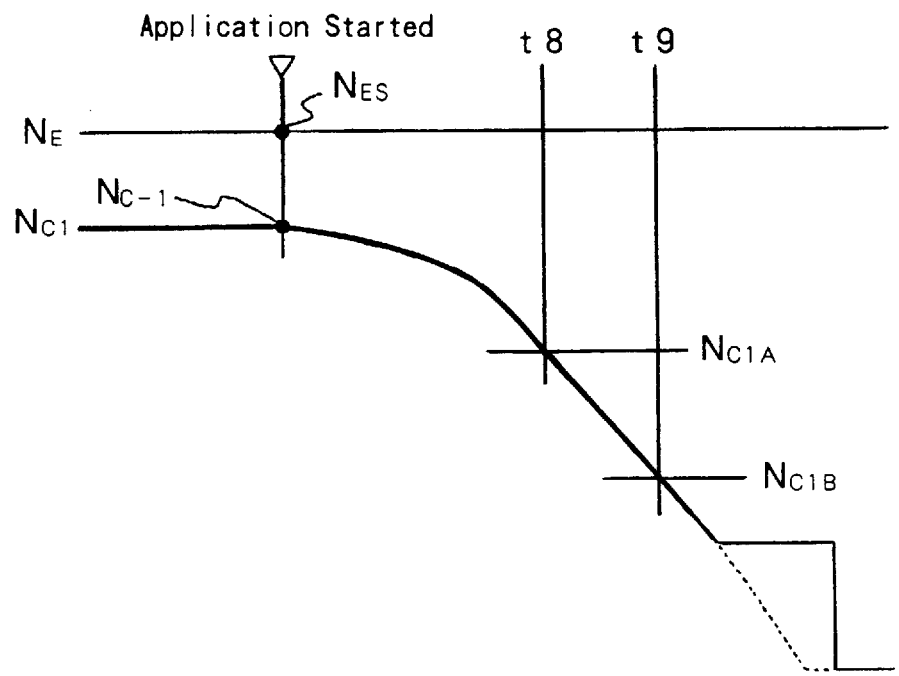
FIG. 25 is a time chart illustrating operation within a preset range for clutch input side RPM in an embodiment of the present invention.
Figure 26:
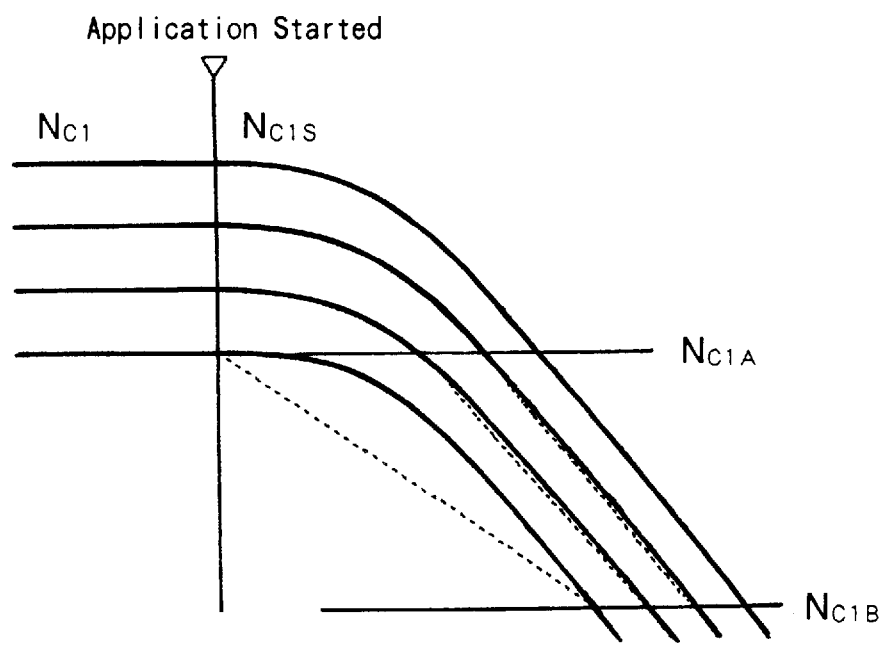
FIG. 26 is a time chart illustrating the average change rate of the clutch input side RPM in an embodiment of the present invention.

Step S3-11-7: The change rate detecting means 103 (FIG. 1) of the automatic transmission control system 41 sets the range for detecting the RPM change rate $DN_i$ of the clutch input side RPM $N_{C1}$ at the time of engagement of the first clutch C1. In the present embodiment, the maximum $N_{C1A}$ and the minimum $N_{C1B}$ of the clutch input side RPM $N_{C1}$ are set, thereby setting a range for time t8 to time t9, as shown in FIG. 25, on the basis of the maximum $N_{C1A}$ and the minimum $N_{C1B}$. The RPM change rate $DN_i$ of the clutch input side RPM $N_{C1}$ in that range is calculated by the following formula:

$$DN_i = (N_{C1A} - N_{C1B})/\tau.$$

wherein τ indicates the time period from time t8 to time t9. Moreover, the minimum $N_{C1B}$ is set on the basis of the detection limit, e.g. 300 rpm, of the RPM sensor 47.

Step S3-11-8: It is decided whether or not a value i is over a value $i_{max}$. The sub-routine advances to Step S3-11-10, if the value i is over the value $i_{max}$, and to Step S3-11-9 if the value i is below the value $i_{max}$.

Step S3-11-9: The value "1" is added to the value i.

Step S3-11-10: A unique RPM change rate $DN_i$ may be detected due to variation of the oil pressure level. Therefore, the calculations of the RPM change rate $DN_i$ are repeated a number of times equal to the value $i_{max}$. After this, the average change rate $DN_{AV}$ of the RPM change rate $DN_i$ is calculated by the following formula:

$$DN_{AV} = \sum_{n=1}^{i_{max}} DN_n / i_{max}.$$

Step S3-11-11: The value i is set to 1.

Step S3-11-12: It is decided whether or not the average $DN_{AV}$ is over the reference RPM change rate $DN_A$. The sub-routine advances to Step S3-11-13, if the average $DN_{AV}$ is over the reference RPM change rate $DN_A$, and to Step S3-11-14 if the average $DN_{AV}$ is below the reference RPM change rate $DN_A$.

Step S3-11-13: The correction means 104 of the automatic transmission control system 41 corrects the constant $P_{C1S}$ and subtracts a correction value DPL from the constant $P_{C1S}$.

Step S3-11-14: It is decided whether or not the average change rate $DN_{AV}$ is below the reference RPM change rate $DN_B$. The sub-routine advances to Step S3-11-15, if the average change rate $DN_{AV}$ is below the reference RPM change rate DNB, but is ended if the average change rate $DN_{AV}$ is over the reference RPM change rate $DN_B$.

Step S3-11-15: The correction means 104 of the automatic transmission control system 41 corrects the constant $P_{C1S}$ and adds the correction value DPL to the constant $P_{C1S}$.

Thus, the RPM change rate $DN_i$ for an excessively high or low oil temperature OT is excluded, to avoid influence of same upon the detected RPM change rate DNi due to fluctuation of the feed state of the C-1 oil pressure $P_{C1}$ or the slip state in the first clutch C1 with the change in the viscous resistance of the oil.

If the repetition number $n_{CU}$ is over the value $F_{CU}$, the first clutch C1 is held in the substantially released state by the in-neutral control so that the RPM change rate $DN_i$ is detected only when the first clutch C1 is to be applied from that state, while excluding the remaining RPM change rate DNi. As a result, no influence is exerted upon the correction of the constant $P_{C1S}$.

Moreover, the RPM change rate $DN_i$, when the engine RPM $N_E$ is excessively high or low for the ordinary idling RPM, is excluded so that the RPM change rate $DN_i$ is not influenced even if the engine RPM $N_E$ becomes unstable.

Further, the RPM change rate $DN_i$, at the time when the clutch input side RPM $N_{C1}$ cannot be detected by the RPM sensor 47, is excluded because of the excessively small clutch input side RPM $N_{C1}$. As a result, no influence is exerted upon the RPM change rate $DN_i$ to be detected.

Furthermore, the RPM change rate $DN_i$ of the clutch input side RPM $N_{C1}$ is detected only when the clutch input side RPM $N_{C1S}$ at the engagement starting time is higher by the set value α than the maximum $N_{C1A}$ of the clutch input side RPM $N_{C1}$ in the aforementioned preset range.

As a result, the RPM change rate $DN_i$ at the initial engagement of the first clutch C1 is excluded from the detected RPM change rate $DN_i$ so that the RPM change rate $DN_i$ corresponding to the C-1 oil pressure $P_{C1}$ can be accurately detected. As a result, it is possible to prevent erroneous learning.

Incidentally, the set value α is set to correspond to the delay in the rise in the C-1 oil pressure $P_{C1}$ fed to the hydraulic servo C-1 of the first clutch C1. As a result, it is possible to maximize the number of chances for correcting the characteristics which are set in the hydraulic control unit 40.

Moreover, the constant $P_{C1S}$ is corrected on the basis of the average change rate $DN_{AV}$ so that the RPM change rate $DN_i$ can be excluded when the unique RPM change rate $DN_i$ is detected. This makes it possible to detect an accurate RPM change rate $DN_i$.

Further, the constant $P_{C1S}$ is corrected by adding/subtracting the correction value DPL so that the average change rate $DN_{AV}$ will not abruptly approach the reference RPM change rates DNA and $DN_B$. As a result, the influence exerted upon the correction of the constant $P_{C1S}$ can be minimized even if the detected RPM change rate $DN_i$ is not accurate.

While the foregoing embodiment has been described for the case in which the present invention is applied to the control of first clutch engagement in neutral control, the present invention can also be applied to N-D control which accompanies the shift from the ordinary N-range to the D-range.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission, comprising:
    a fluid transmission unit connected to an engine;
    a clutch applied when a forward running range is selected, for transmitting the rotation of said fluid transmission unit to a speed change unit;
    a hydraulic servo for applying said clutch responsive to feed of an oil pressure;
    output RPM detecting means for detecting output RPM of said fluid transmission unit;
    oil pressure generating means for generating the oil pressure fed to said hydraulic servo; and
    a control unit, including:
        a memory containing a preset range for said output RPM, a maximum RPM in said preset range and a preset value;
        booster means for raising said oil pressure according to preset characteristics stored in said memory;
        change rate detecting means for detecting RPM change rate of the output RPM, within said preset range for said output RPM, at the time of application of said clutch, said change rate detecting means detecting said RPM change rate only when the output RPM at the time of start of engagement of said clutch is higher by said preset value than said maximum RPM in said preset range for said output RPM; and
        correction means for correcting said preset characteristics on the basis of a comparison of the RPM change rate, as detected by said change rate detecting means, with a reference RPM change rate.

2. A control system for an automatic transmission according to claim 1, wherein said booster means lowers the oil pressure fed to said hydraulic servo to thereby substantially release said clutch when the vehicle is stopped while the forward running range is selected, and raises the oil pressure fed to said hydraulic servo, according to the preset characteristics, when the vehicle is to be started in motion.

3. A control system for an automatic transmission according to claim 2, wherein said preset value is set on the basis of the delay in the rise of the oil pressure fed to the hydraulic servo.

4. A control system for an automatic transmission according to claim 2, wherein said correction means corrects said preset characteristics on the basis of the result of a comparison between the average of a plurality of RPM change rates detected by said change rate detecting means and said reference RPM change rate.

5. A control system for an automatic transmission according to claim 2, wherein said correction means corrects said preset characteristics so that the RPM change rate, as detected by said change rate detecting means, gradually approaches said reference RPM change rate.

6. A control system for an automatic transmission according to claim 2, wherein said change rate detecting means detects said RPM change rate only when an oil temperature is within a preset range.

7. A control system for an automatic transmission according to claim 2, wherein said change rate detecting means detects said RPM change rate only when the engagement of said clutch is started from the substantially released state.

8. A control system for an automatic transmission according to claim 2, wherein said change rate detecting means detects said RPM change rate only when the RPM of said engine is within said preset range.

9. A control system for an automatic transmission according to claim 8, wherein the lower limit for said present range is set on the basis of the detection limit of said output RPM detecting means.

10. A control system for an automatic transmission according to claim 2, wherein the lower limit for said present range is set on the basis of the detection limit of said output RPM detecting means.

* * * * *

UNITED STATES PATENT AND TRADEMARK OFFICE
CERTIFICATE OF CORRECTION

PATENT NO.    : 6,139,471
DATED         : October 31, 2000
INVENTOR(S)   : Tsutsui et al.

Page 1 of 2

It is certified that error appears in the above-identified patent and that said Letters Patent is hereby corrected as shown below:

Column 6,
Line 10, "brake" should read -- clutch --;
Line 25, "BE" should read -- B1 --.

Column 8,
Line 13, "L-S" should read -- L-5 --.

Column 10,
Line 30, "D1" should read -- B1 --.

Column 13,
Line 25, "$_\Delta$RB" should read -- $\Delta_{RB}$ --.

Column 16,
Line 50, "$P_{C1}\Delta P_{C1}\Delta \leftarrow P_{DOWN}$" should read -- $P_{C1} \leftarrow P_{C1} \leftarrow \Delta P_{DOWN}$ --; and
Line 55, "$\Delta N_m \Delta \Delta N$" should read -- $\Delta N_m \leftarrow \Delta N$ -- .

Column 19,
Line 24, "OP" should read -- OT --;
Line 28, "OP" should read -- OT --.

Column 20,
Line 46, "DNB" should read -- $\Delta N_B$ --;
Line 53, "DNi" should read -- $\Delta N_t$ --; and
Line 62, "DNi" should read -- $\Delta N_t$ --.

Column 21,
Line 31, "DNA" should read -- $\Delta N_A$ --.

UNITED STATES PATENT AND TRADEMARK OFFICE
CERTIFICATE OF CORRECTION

PATENT NO. : 6,139,471
DATED : October 31, 2000
INVENTOR(S) : Tsutsui et al.

It is certified that error appears in the above-identified patent and that said Letters Patent is hereby corrected as shown below:

<u>Column 22,</u>
Line 59, "present" should read -- preset --.

Signed and Sealed this

Fourth Day of December, 2001

*Attest:*

*Attesting Officer*

NICHOLAS P. GODICI
*Acting Director of the United States Patent and Trademark Office*